US012230885B2

(12) United States Patent
Kartout

(10) Patent No.: US 12,230,885 B2
(45) Date of Patent: Feb. 18, 2025

(54) RF DEVICE WITH ISOLATED ANTENNAS

(71) Applicant: SAGEMCOM BROADBAND SAS, Rueil Malmaison (FR)

(72) Inventor: Madani Kartout, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 176 days.

(21) Appl. No.: 17/966,308

(22) Filed: Oct. 14, 2022

(65) Prior Publication Data

US 2023/0120328 A1 Apr. 20, 2023

(30) Foreign Application Priority Data

Oct. 15, 2021 (FR) ........................................ 2110982

(51) Int. Cl.

| | |
|---|---|
| ***H01Q 21/28*** | (2006.01) |
| ***H01Q 9/28*** | (2006.01) |
| ***H01Q 21/20*** | (2006.01) |

(52) U.S. Cl.
CPC ............. *H01Q 21/28* (2013.01); *H01Q 9/285* (2013.01); *H01Q 21/20* (2013.01)

(58) Field of Classification Search
CPC ......... H01Q 21/28; H01Q 9/285; H01Q 21/20
See application file for complete search history.

*Primary Examiner* — Graham P Smith
(74) *Attorney, Agent, or Firm* — MUNCY, GEISSLER, OLDS & LOWE, P.C.

(57) ABSTRACT

An RF device includes a first antenna set made up of a first antenna and a second antenna, the first and second antennas being planar in shape and both lying in a common first plane, the first antenna being arranged to operate in a first frequency band and the second antenna being arranged to operate in a second frequency band; and a first isolator, the first isolator being planar in shape and lying in the first plane between the first and second antennas, the first isolator having at least one branch that is electrically conductive, the first isolator being electrically floating, the first isolator being arranged to reduce first coupling by electromagnetic radiation between the first and second antennas in the first frequency band and/or in the second frequency band.

29 Claims, 12 Drawing Sheets

RF DEVICE WITH ISOLATED ANTENNAS

The invention relates to the field of radiofrequency (RF) devices having a plurality of antennas. The invention applies in particular when the antennas operate in frequency bands that are adjacent or indeed similar.

BACKGROUND OF THE INVENTION

Certain recent pieces of electrical equipment, e.g. residential gateways, have a plurality of antennas in order to transmit and receive RF signals in different frequency bands. In order to limit interference between the antennas, it is appropriate to ensure that said antennas are correctly isolated from one another. This is particularly critical when the frequency bands used by a single piece of equipment are adjacent (e.g. 5 gigahertz (GHz) Wi-Fi and 6 GHz Wi-Fi), or indeed similar.

It is known to incorporate filter means, e.g. comprising analog electronic components, in the transmit and receive channels for RF signals. Nevertheless, such a solution has an impact on the transmitted or received RF signals regardless of their directions of propagation. Furthermore, that solution generally presents performance that is poor when the frequency bands are adjacent.

Also known are diversity techniques, e.g. making use of space diversity, of polarization diversity, or indeed of radiation pattern diversity. Nevertheless, the performance of those techniques is generally limited when they are implemented in a piece of equipment that is compact. In particular, they do not make it possible for RF signals to be propagated omnidirectionally in multiple-input multiple-output (MIMO) RF systems making use of frequency bands that are adjacent.

It is also known to make use of isolating elements such as screens, reflectors, or indeed absorbers, made out of one or more pieces of metal. Nevertheless, isolating elements made in that way provide poor performance when they are incorporated in a device that is compact.

OBJECT OF THE INVENTION

An object of the invention is to propose a compact RF device that meets the isolation constraints set out above when use is being made of frequency bands that are adjacent.

SUMMARY OF THE INVENTION

In order to achieve this object, there is provided an RF device comprising:

- a first antenna set made up of a first antenna and a second antenna, the first and second antennas being planar in shape and both lying in a common first plane, the first antenna being arranged to operate in a first frequency band and the second antenna being arranged to operate in a second frequency band;
- a first isolator, the first isolator being planar in shape and lying in the first plane between the first and second antennas, the first isolator having at least one branch that is electrically conductive, the first isolator being electrically floating, the first isolator being arranged to reduce first coupling by electromagnetic radiation between the first and second antennas in the first frequency band and/or in the second frequency band.

The RF device of the invention is particularly advantageous, since the arrangement of the first and second antennas together with the configuration of the first isolator that is not electrically connected to a ground plane between said antennas ensure that the RF device is compact while meeting the isolation constraints set out above.

In a particular embodiment, the first and second frequency bands are separated by a frequency gap lying in the range approximately 0 megahertz (MHz) to approximately 1 GHz.

In a particular embodiment, the first antenna set and the first isolator are positioned on a support made out of a dielectric material, the support lying in the first plane.

In a particular embodiment, the first isolator has first and second branches that are both electrically conductive, the second branch being substantially perpendicular to the first branch and projecting from a central portion of the first branch, a free end of the second branch being open circuit, the first isolator thus being T-shaped.

In a particular embodiment, the first and second antennas are planar dipole antennas, each being rectangular in shape, the first antenna being arranged to generate a first maximum electric field along a first axis, the second antenna being arranged to generate a second maximum electric field along a second axis, and the first and second axes being substantially parallel to each other.

In a particular embodiment, the first and second axes are oriented at substantially 45° relative to the second branch.

In a particular embodiment, the first and second axes are substantially perpendicular to the second branch.

In a particular embodiment, the first maximum electric field is greater than the second maximum electric field, one end of the first branch of the first isolator being spaced apart from the first axis by a distance lying in the range 5 millimeters (mm) to 1.5 centimeters (cm).

In a particular embodiment, the first isolator is arranged to reduce the first coupling by electromagnetic radiation to a greater extent in the first frequency band, the first branch of the first isolator having a predefined length that is substantially equal to at least one quarter of a first wavelength $\lambda_A$, the first wavelength $\lambda_A$ being such that:

$$\lambda_A = \frac{c}{v_1 \times \sqrt{\varepsilon r}}$$

where $v_1$ is a first center frequency centered between the maximum frequency and the minimum frequency of the first frequency band, and where $\varepsilon r$ is the dielectric permittivity of the medium in which the first isolator lies, the medium being a dielectric support or air.

In a particular embodiment, the first isolator is arranged to reduce the first coupling by electromagnetic radiation in equal manner in the first and second frequency bands, the first branch of the first isolator having a predefined length that is substantially equal to at least one quarter of a first wavelength $\lambda_A$, the first wavelength $\lambda_A$ being such that:

$$\lambda_A = \frac{c}{\frac{v_1 + v_2}{2} \times \sqrt{\varepsilon r}}$$

where $v_1$ is a first center frequency centered between the maximum frequency and the minimum frequency of the first frequency band, where $v_2$ is a second center frequency centered between the maximum frequency and the minimum frequency of the second frequency band, and where $\varepsilon r$ is the dielectric permittivity of the medium in which the first isolator lies, the medium being a dielectric support or air.

In a particular embodiment, the second branch of the first isolator has a predefined length that is substantially equal to one quarter of the first wavelength $\lambda_A$.

In a particular embodiment, the first branch of the first isolator has a width that is predefined so that the characteristic impedance of said first branch is substantially equal to the characteristic impedance of one antenna selected from the first and second antennas, the second branch of the first isolator having a width that is predefined so that the characteristic impedance of said second branch is substantially equal to the characteristic impedance of the antenna selected from the first and second antennas.

In a particular embodiment, the first branch of the first isolator has a width that is predefined so that the characteristic impedance of said first branch lies substantially in the range 75 ohms (Ω) to 120Ω, the second branch of the first isolator having a width that is predefined so that the characteristic impedance of said second branch lies substantially in the range 75Ω to 120Ω.

In a particular embodiment, the first isolator has three branches that are all electrically conductive and that are arranged in such a manner that said first isolator is Y-shaped.

In a particular embodiment, the above-described RF device further comprises at least one second isolator having at least one electrically conductive branch, the second isolator being electrically floating, the second isolator being positioned on one side of a particular antenna selected from the first and second antennas, said side of the particular antenna being remote from the first isolator, the second isolator being arranged to correct a modification to the directivity of the particular antenna as caused by the presence of the first isolator.

In a particular embodiment, the second isolator has a single electrically conductive branch, said isolator thus having a shape that is longitudinal.

In a particular embodiment, the above-described RF device has a third antenna extending in a second plane, the second isolator also being arranged to reduce second coupling by electromagnetic radiation between the third antenna and the particular antenna over a particular frequency band in which the particular antenna operates and over a third frequency band in which the third antenna operates.

In a particular embodiment, the second isolator is arranged to reduce the second coupling by electromagnetic radiation to a greater extent in the particular frequency band, the single branch of the second isolator having a predefined length that is substantially equal to half a second wavelength $\lambda_B$, the second wavelength $\lambda_B$ being such that:

$$\lambda_B = \frac{c}{\nu_\# \times \sqrt{\varepsilon r}}$$

where $\nu_\#$ is a particular center frequency centered between the maximum frequency and the minimum frequency of the particular frequency band, and where εr is the dielectric permittivity of the medium in which the second isolator lies, the medium being a dielectric support or air.

In a particular embodiment, the second isolator is arranged to reduce the second coupling by electromagnetic radiation in equal manner in the particular frequency band and in the third frequency band, the single branch of the second isolator having a predefined length that is substantially equal to half a second wavelength $\lambda_B$, the second wavelength $\lambda_B$ being such that:

$$\lambda_B = \frac{c}{\frac{\nu_\# + \nu_3}{2} \times \sqrt{\varepsilon r}}$$

where $\nu_\#$ is a particular center frequency centered between the maximum frequency and the minimum frequency of the particular frequency band, where $\nu_3$ is a third center frequency centered between the maximum frequency and the minimum frequency of the third frequency band, and where εr is the dielectric permittivity of the medium in which the second isolator lies, the medium being a dielectric support or air.

In a particular embodiment, the branch of the second isolator has a width that is predefined so that the characteristic impedance of said branch is substantially equal to the characteristic impedance of an antenna selected from the particular antenna and the third antenna.

In a particular embodiment, the branch of the first isolator has a width that is predefined so that the characteristic impedance of said branch lies substantially in the range 75Ω to 120Ω.

In a particular embodiment, the second isolator is situated in the proximity of an intersection between the first and second planes.

In a particular embodiment, the second isolator is positioned in an intersecting plane that intersects the first and second planes.

In a particular embodiment, the second isolator forms a rounded corner between the first and second planes.

In a particular embodiment, the first and second planes are perpendicular.

In a particular embodiment, the above-described RF device includes a second antenna set comprising the third antenna and a fourth antenna, the second antenna set being similar to the first antenna set, and also including a third isolator similar to the first isolator and positioned between the third and fourth antennas.

In a particular embodiment, the above-described RF device comprises a support having four faces comprising two mutually parallel first faces and two mutually parallel second faces, two first antenna sets each positioned on a distinct first face, and two second antenna sets each positioned on a distinct second face, the RF device further comprising two first isolators each positioned between the first and second antennas of a distinct first antenna set, two third isolators each positioned between a third antenna and a fourth antenna of a distinct second antenna set, and four second isolators each positioned in a distinct corner of the support.

The invention also provides a MIMO system comprising an RF device as described above together with an RF transmitter and an RF receiver both connected to the first and second antenna sets of said RF device.

The invention also provides electronic equipment comprising a MIMO system as described above.

In a particular embodiment, the electronic equipment is a residential gateway.

Other characteristics and advantages of the invention appear on reading the following description of particular, nonlimiting embodiments of the invention.

BRIEF DESCRIPTION OF THE DRAWINGS

The description of embodiments refers to the accompanying drawings, in which.

DETAILED DESCRIPTION OF THE INVENTION

Figure 1:
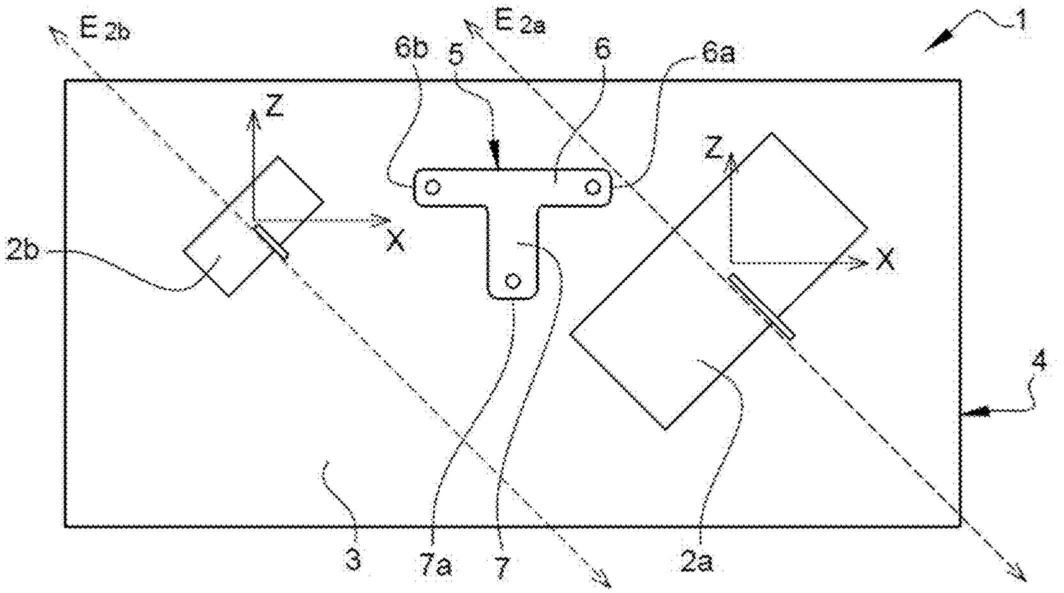
FIG. 1 is a plan view of an RF device in an embodiment.

With reference to FIG. 1, there follows a description of an RF device 1 in an embodiment.

The RF device 1 includes a first antenna set 2 comprising a first antenna 2*a* and a second antenna 2*b*. The first and second antennas 2*a* and 2*b* are planar shapes and both of them lie in a first plane 3. The first plane 3 is defined by an axis X and by an axis Z, the axes X and Z being perpendicular.

In this example, the first and second antennas 2*a* and 2*b* are positioned on a support 4 made out of a dielectric material and lying in the first plane 3. Specifically, in this example, the support 4 is made out of a plastics material presenting dielectric permittivity greater than 1 (e.g. the dielectric permittivity of the plastics material used is equal to about 3).

The first antenna 2*a* operates in a first frequency band, and the second antenna 2*b* operates in a second frequency band. It should be understood that when an antenna is said herein to operate in a frequency band (or at a frequency), that means that said antenna is designed to transmit and/or receive RF signals optimally in said frequency band (or at said frequency).

Also, in this example, the first and second frequency bands are different, but adjacent. When the first and second frequency bands are said herein to be "adjacent", that means that they are separated by a frequency gap lying in the range approximately 0 MHz to approximately 1 GHz. For example, if the first frequency band is lower than the second frequency band, said frequency gap is the difference between the minimum frequency of the second frequency band and the maximum frequency of the first frequency band.

By way of example, the first antenna 2*a* could be a dual-band antenna operating at a frequency equal to 2.4 GHz and at a frequency equal to 5 GHz, and the second antenna 2*b* could be a simple single-band antenna operating at a frequency of 6 GHz.

By way of another example, the first antenna 2*a* could be a single-band antenna operating in a 5 GHz frequency band in the range 5170 MHz to 5835 MHz, and the second antenna 2*b* could be a single-band antenna operating in a 6 GHz frequency band in the range 5925 MHz to 7125 MHz.

In this example, the first and second antennas 2*a* and 2*b* are planar dipole antennas on supports that are rectangular in shape. The first and second antennas 2*a* and 2*b* both present respective omnidirectional radiation patterns that are toroidal in shape. The first antenna 2*a* generates a first maximum electric field on a first axis $E_{2a}$ and the second antenna 2*b* generates a second maximum electric field on a second axis $E_{2b}$. The first axis $E_{2a}$ is an axis of symmetry of the first antenna 2*a* parallel to its width. The second axis $E_{2b}$ is an axis of symmetry of the second antenna 2*b* parallel to its width.

In this example, the first and second axes $E_{2a}$ and $E_{2b}$ are parallel.

The RF device 1 also has a first isolator 5 of planar shape that lies in the first plane 3 between the first and second antennas 2*a* and 2*b*. In this example, the first isolator 5 is generally centered between the first and second antennas 2*a* and 2*b*.

The first isolator 5 is positioned on the support 4 and it is fastened by fastener means, e.g. comprising thermoplastic stakes, adhesive, or indeed screws.

Still with reference to FIG. 1, the first isolator 5 comprises both a first branch 6 and a second branch 7. In this example, the first and second branches 6 and 7 of the first isolator 5 are formed by plane, rectilinear tracks made out of a conductive material, e.g. aluminum, copper, or indeed iron.

Also, in this example the second branch 7 of the first isolator 5 is perpendicular to the first branch 6 of the first isolator 5 and it projects from a central portion of said first branch 6. The first isolator 5 is thus T-shaped. The T-shape is simple and it facilitates fabrication of the first isolator 5, since it is a shape that can be cut out accurately (in particular from a metal plate) and that is easily reproducible.

Thus, the first branch 6 of the first isolator 5 is an open circuit transmission line between a first end 6*a* and a second end 6*b*. Furthermore, the second branch 7 of the first isolator 5 is a stub that is open circuit at a free end 7*a*. Thus, the first and second branches 7 and 6 of the first isolator 5 are electrically connected together in parallel. The first isolator 5 is thus a passive element that performs the function of a reciprocal bandstop resonator. The first isolator 5 thus presents a transmission coefficient that is the same regardless of the flow direction of electric current flowing through its first branch 6 and its second branch 7.

Also, the first isolator 5 is not electrically connected. In particular, the first isolator 5 is not connected to an electrical ground plane. The first isolator 5 is thus electrically floating. It should be observed in particular that this floating configuration of the first isolator 5 is particularly different from the solutions of the prior art. Specifically, in the prior art, there exist isolators that are mounted on a printed circuit board (PCB), but using a PCB (which presents, in particular, magnetic permeability) requires said isolators to the connected to the electrical ground plane of said PCB.

In this example, the first and second axes $E_{2a}$ and $E_{2b}$ are both oriented at an angle equal to 45° relative to the second branch 7 of the first isolator 5. The first axis $E_{2a}$ passes directly in the vicinity of the first end 6*a* of the first branch 6 of the first isolator 5.

The dimensions of the first isolator 5 are predefined as a function of the available space, of the environment in which it is used, and of the frequency band in which it is to have maximum influence. Specifically, it is important to consider the environment in which the device 1 in an embodiment of the invention is to be applied, and in particular the electrical parameters of the materials used (such as dielectric permittivity), which have an impact on the wavelengths, on the resonant frequencies, and also on the characteristic impedances of the transmission lines (i.e. of the tracks).

Preferably, the first branch 6 of the first isolator 5 has a length that is approximately equal to at least one quarter of a first wavelength $\lambda_A$ taking account of the medium in which the first isolator 5 extends.

In a first example, the first isolator 5 is designed to attenuate coupling by electromagnetic radiation between the first and second antennas 2*a* and 2*b* in the first frequency band and also in the second frequency band, but to do so to a greater extent in the first frequency band (in which the first antenna 2*a* operates). If the medium in which the first isolator 5 extends is air, then the first wavelength $\lambda_A$ is calculated using dielectric permittivity equal to 1. In contrast, if the medium in which the first isolator 5 extends is a dielectric support (e.g. a support made of plastics material), then the dielectric permittivity of said dielectric support is taken into account and the first wavelength $\lambda_A$ is such that:

$$\lambda_A = \frac{c}{v_1 \times \sqrt{\varepsilon r}}$$

where εr is the dielectric permittivity of the material used for making the dielectric support, where $\nu_1$ is a first center frequency that is centered between the maximum frequency and the minimum frequency of the first frequency band (in which the first antenna 2*a* operates), and where c is the velocity of the electromagnetic wave.

For example, if the first frequency band is a frequency band in the range 5.1 GHz to 5.9 GHz, then the first center frequency $\nu_1$ is equal to about 5.5 GHz.

In another example, the first isolator 5 is designed to attenuate the coupling by electromagnetic radiation between the first and second antennas 2*a* and 2*b* in balanced (or equal) manner between the first and second frequency bands. By way of example, the first frequency band is a so-called "5 GHz" frequency band and the second frequency band is a so-called "6 GHz" frequency band. If the medium in which the first isolator 5 extends is not air, then the first wavelength $\lambda_A$ is such that:

$$\lambda_A = \frac{c}{\frac{v_1 + v_2}{2} \times \sqrt{\varepsilon r}}$$

where $\nu_1$ is the first center frequency of the first frequency band (e.g. 5.5 GHz), and where $\nu_2$ is a second center frequency that is centered between the maximum frequency and the minimum frequency of the second frequency band (e.g. 6.5 GHz). Other examples of dimensions for the first branch 6 of the first isolator 5 may be obtained depending on the isolation desired for the first frequency band or for the second frequency band.

The second branch 7 of the first isolator 5 has a length that is approximately equal to one quarter of the selected first wavelength $\lambda_A$. The selected first wavelength $\lambda_A$ corresponds to a selected first frequency that, by way of example, is equal to 6.2 GHz when it is desired to obtain isolation at the beginning of the so-called 6 GHz frequency band (UNII-5). By way of example, the selected first frequency may equally well depend both on the first center frequency $\nu_1$ of the first frequency band (in which the first antenna 2*a* operates) and also on the second center frequency $\nu_2$ of the second frequency band (in which the second antenna 2*b* operates). For example, the selected center frequency may be equal to $(\nu_1+\nu_2)/2$.

In an example, the dimensions of the first isolator 5, and in particular the respective widths of the first branch 6 and of the second branch 7, depend on the characteristics of a selected one of the first and second antennas 2*a* and 2*b*. The respective dimensions of the first and second antennas 2*a* and 2*b* are considered in order to select the greatest dimension(s). For example, when the first frequency band (in which the first antenna 2*a* operates) is the so-called 5 GHz frequency band and the second frequency band (in which the second antenna 2*b* operates) is the so-called 6 GHz frequency band, then the radiating tracks or strands of the first antenna 2*a* are of dimensions or sizes that are greater than the radiating tracks or strands of the second antenna 2*b*. The widths of the radiating tracks or strands of the selected antenna serve to determine the width of the first branch 6 and/or of the second branch 7 of the first isolator 5. If the first frequency band (first antenna 2*a*) is the so-called 5 GHz frequency band and the second frequency band (second antenna 2*b*) is the so-called 6 GHz frequency band, then the respective widths of the first and second branches 6 and 7 of the first isolator 5 may be about 2.5 mm to 3 mm.

The first antenna 2*a* is selected so as to determine the dimensions of the first isolator 5 and the first antenna 2*a* is positioned on a PCB, itself resting on a first dielectric support (e.g. made out of a plastics material), with the assembly (the PCB and the first plastics material) presenting dielectric permittivity that is equal to about 4.3. In an example, the first isolator 5 is positioned on a second dielectric support (e.g. made out of a plastics material) that may be identical to or different from the first dielectric support on which the first antenna 2*a* is positioned, and that presents dielectric permittivity equal to about 3. As a result of the proximity of two different dielectric permittivities, and given that the first antenna 2*a* is selected for determining the dimensions of the first isolator 5, the respective characteristic impedances of the first and second branches 6 and 7 of the first isolator 5 are approximately equal to the characteristic impedance of the first antenna 2*a*.

In other examples, the first and second branches 6 and 7 of the first isolator 5 are of respective widths that ensure that the respective characteristic impedances of said first and second branches 6 and 7 lie in the range [75Ω, 120Ω]. This makes it possible to maximize electric current flowing through said first and second branches 6 and 7 and also to maximize the attenuation of coupling by electromagnetic radiation.

Also, the first isolator 5 operates in the near field. Still assuming that the first isolator 5 is arranged to attenuate coupling by electromagnetic radiation between the first and second antennas 2*a* and 2*b* more strongly in the first frequency band, then the distance between the first end 6*a* of the first branch 6 of the first isolator 5 and the first axis $E_{2a}$ lies in the range 5 mm to 1 cm. This distance serves to optimize limiting of the magnitude of the electric field generated by the first antenna 2*a* and picked up by the second antenna 2*b*. In another example, this distance is greater than 1 cm, e.g. 1.5 cm.

FIGS. 2, 3, 4, and 5 illustrate the role of the first isolator 5 in the RF device 1. In this example, the first antenna 2*a* is a Wi-Fi antenna operating in a frequency band ranging from 5.1 GHz to 5.9 GHz. In this example, the second antenna 2*b* is a Wi-Fi antenna operating in a frequency band ranging from 5.9 GHz to 7.2 GHz. The first frequency band of the first antenna 2*a* and the second frequency band of the second antenna 2*b* are thus adjacent.

In each of FIGS. 2, 3, 4, and 5, curved field lines represent the orientation of the electric field in the first plane 3. Furthermore, in this example, the magnitude of said electric field (in volts per meter ($V \cdot m^{-1}$)) is represented by grayscale levels.

Figure 2:
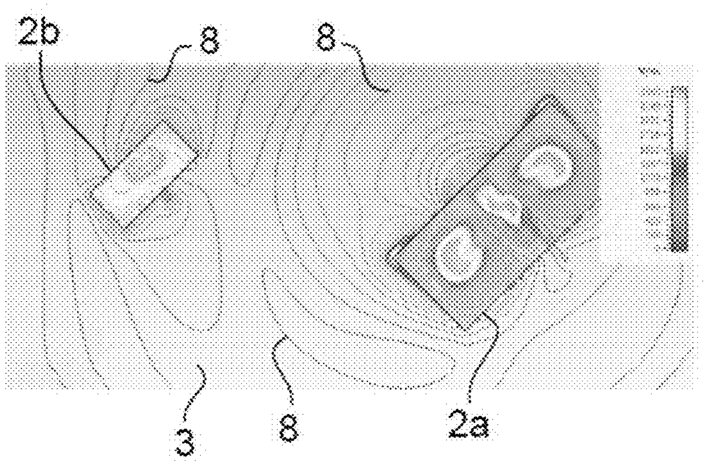
FIG. 2 shows a simulation of the operation of the RF device shown in FIG. 1 when the first antenna is transmitting, and the first isolator is not present.
Figure 3:
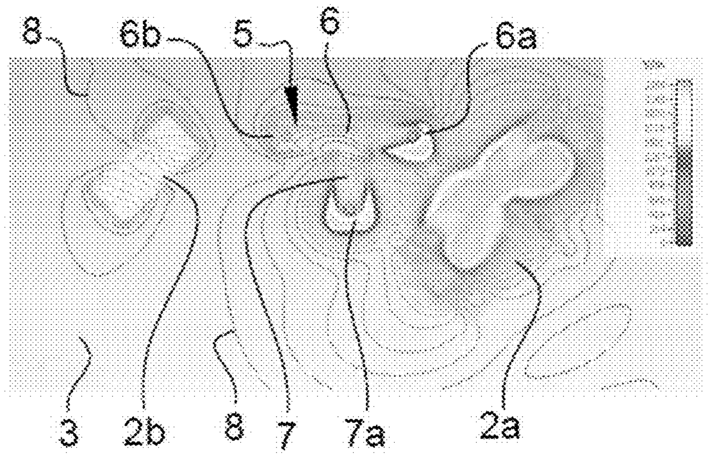
FIG. 3 shows a simulation of the operation of the RF device shown in FIG. 1 when the first antenna is transmitting, and the first isolator is present.

With reference to FIGS. 2 and 3, the first antenna 2*a* is operating in transmission, i.e. it is transmitting RF signals in its frequency band. Field lines 8 thus represent the orientation of the electric field generated by the first antenna 2*a*. In contrast, the second antenna 2*b* is inactive, i.e. it is neither transmitting nor receiving any RF signals in its frequency band.

When the RF device 1 does not include the first isolator 5 (FIG. 2), the electric field generated by the first antenna 2*a* propagates without obstacle through the support 4 to the second antenna 2*b*. The second antenna 2*b* thus picks up a large portion of the electric field generated by the first antenna 2*a*. The field lines 8 are thus concentrated on and in the neighborhood of the second antenna 2*b*. Thus, knowing that the first and second antennas 2*a* and 2*b* operate in respective frequency bands that are adjacent, coupling by electromagnetic radiation between the first and second antennas 2*a* and 2*b* is considerable.

When the radiofrequency device 1 includes the first isolator 5 (FIG. 3), the electric field generated by the first antenna 2*a* is filtered, i.e. it is attenuated because of the reciprocal bandstop resonator function of said first isolator 5. The field lines 8 are thus concentrated on and in the neighborhood of the first isolator 5 (and not in the neighborhood of the second antenna 2*b*). More precisely, the electric field generated by the first antenna 2*a* is concentrated at the first end 6*a* of the first branch 6 of the first isolator 5 and at the free end 7*a* of the second branch 7 of the first isolator 5. Coupling by electromagnetic radiation between the first and second antennas 2*a* and 2*b* is thus significantly reduced. Also, the first isolator 5 modifies the near field orientation of the electric field generated by the first antenna 2*a*.

Figure 4:
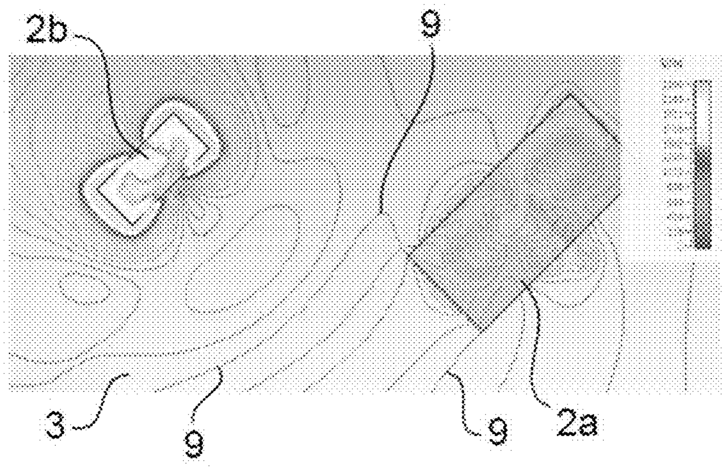
FIG. 4 shows a simulation of the operation of the RF device shown in FIG. 1 when the second antenna is transmitting, and the first isolator is not present.
Figure 5:
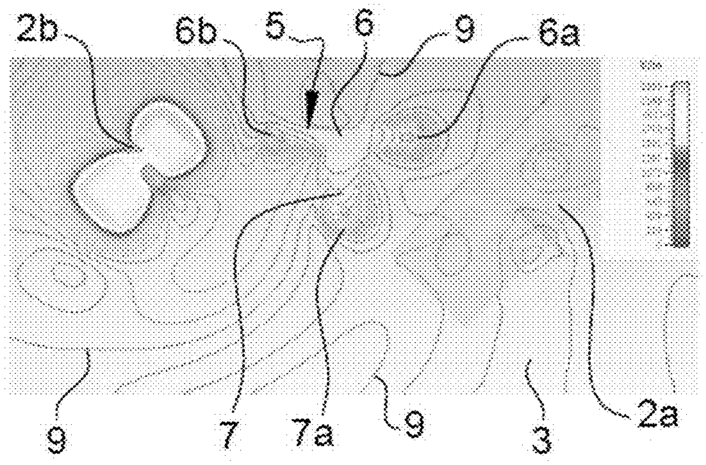
FIG. 5 shows a simulation of the operation of the RF device shown in FIG. 1 when the second antenna is transmitting, and the first isolator is present.

In the example shown in FIGS. 4 and 5, the first antenna 2*a* is inactive and the second antenna 2*b* is operating in transmission. Field lines 9 thus represent the orientation of the electric field generated by the second antenna 2*b*.

When the RF device 1 does not include the first isolator 5 (FIG. 4), the electric field generated by the second antenna 2*b* propagates without obstacle through the support 4 to the first antenna 2*a*. The field lines 9 are thus concentrated on and in the neighborhood of the first antenna 2*a*.

Coupling by electromagnetic radiation between the first and second antennas 2*a* and 2*b* is thus considerable.

When the RF device 1 includes the first isolator 5 (FIG. 5), the field lines 9 are concentrated at the first and second ends 6*a* and 6*b* of the first branch 6 of the first isolator 5 and at the free end 7*a* of the second branch 7 of the first isolator 5. The number of field lines 9 in the neighborhood of the first antenna 2*a* is thus greatly reduced. Coupling by electromagnetic radiation between the first and second antennas 2*a* and 2*b* is thus significantly reduced.

It should be observed that the first isolator 5 presents better performance when it is the first antenna 2*a* that is transmitting (in comparison with when it is the second antenna 2*b* that is transmitting). This result is logical, since the dimensions of the first isolator 5 in this example are determined to operate in the neighborhood of the maximum frequency of the first frequency band (ranging from 5.1 GHz to 5.9 GHz).

Figure 6:
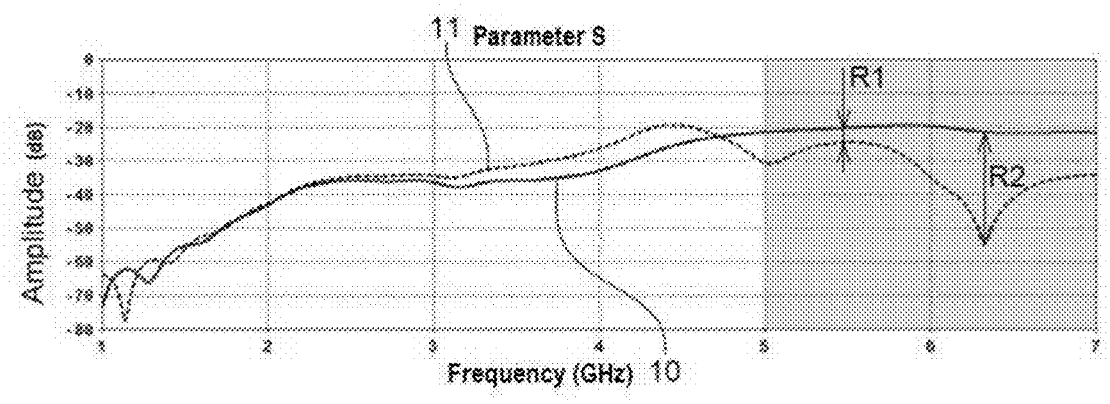
FIG. 6 plots the parameter $S_{21}$ as a function of the frequency of the RF device shown in FIG. 1.

FIG. 6 plots the amplitude in dB of a parameter $S_{21}$ (known as the "scattering" parameter) as a function of frequency. The parameter $S_{21}$ corresponds to the transmission coefficient between the second antenna 2*b* and the first antenna 2*a*. The curve 10 is the curve for the parameter $S_{21}$ when the first isolator 5 is not present, and the curve 11 is the curve for the parameter $S_{21}$ when the first isolator 5 is present. In this example, the first isolator 5 has dimensions designed to attenuate coupling by electromagnetic radiation between the first and second antennas 2*a* and 2*b* in a frequency band ranging from 5 GHz to 7 GHz. It can clearly be seen that the first isolator 5 reduces the amplitude of the parameter $S_{21}$ in the frequency band for which it is designed. Specifically, in the vicinity of a frequency equal to 5.5 GHz, there can be seen minimum reduction in the amplitude of the parameter $S_{21}$ that is equal to about 5 decibels (dB) (reference R1 in FIG. 6), and in the vicinity of a frequency equal to 6.3 GHz, there can be seen maximum reduction of about 34 dB (reference R2 in FIG. 6). The first isolator 5 thus serves effectively to attenuate coupling by electromagnetic radiation between the first and second antennas 2_a_ and 2_b_ in the frequency band for which it is designed.

Figure 7:
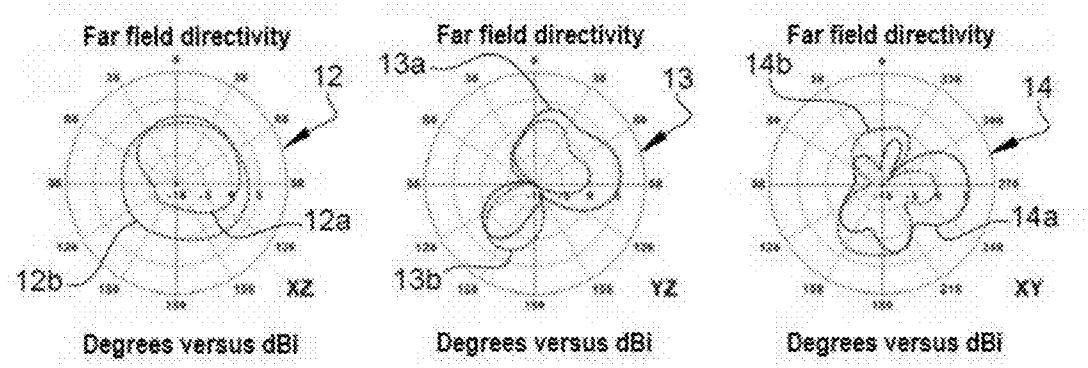
FIG. 7 plots the radiation patterns of the first antenna of the RF device shown in FIG. 1.
Figure 8:
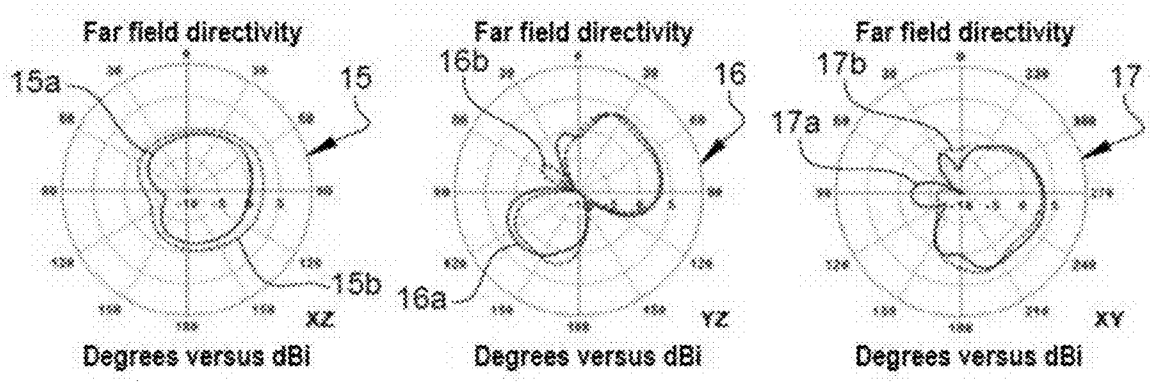
FIG. 8 plots the radiation patterns of the second antenna of the RF device shown in FIG. 1.

With reference to FIGS. 7 and 8, an axis Y has been added that is perpendicular to the axes X and Z such that the three axes X, Y, and Z form an orthogonal reference frame (in three-dimensional space), with each of these figures showing three sections, a first section XZ (i.e. a section on the first plane 3), a second section YZ, and a third section XY.

FIG. 7 plots a radiation pattern 12 for the first antenna 2_a_ in the first section XZ, a radiation pattern 13 for the first antenna 2_a_ in the second section YZ, and a radiation pattern 14 for the first antenna 2_a_ in the third section XY. The radiation patterns 12, 13, and 14 correspond to the situation as shown in FIGS. 2 and 3, i.e. the first antenna 2_a_ is transmitting (in the first frequency band ranging from 5.1 GHz to 5.9 GHz), and the second antenna 2_b_ is inactive. It is common practice to characterize an RF antenna by using its radiation pattern, which plots the angular distribution (in degrees) of the gain of said antenna (in decibels relative to isotropic (dBi)).

In the radiation patterns 12, 13, and 14, the continuous line curve corresponds to the far field directivity of the first antenna 2_a_ when the first isolator 5 is not present, and the dashed line curve corresponds to the far field directivity of the first antenna 2_a_ when the first isolator 5 is present.

The radiation patterns 12, 13, and 14 reveal that the first isolator 5 modifies the far field directivity of the first antenna 2_a_.

In particular, the radiation pattern 12 in the first section XZ shows that the far field directivity of the first antenna 2_a_ is more uniform when the first isolator 5 is present (curve 12_b_). The term "uniform" is used to mean that the gain of the first antenna 2_a_ is substantially constant as a function of the propagation angle of the radiation transmitted by said first antenna 2_a_. More precisely, when the first isolator 5 is not present (curve 12_a_), the maximum relative variation in the gain of the first antenna 2_a_ is about 8 dBi, whereas when the first isolator 5 is present (curve 12_b_), the maximum relative variation in the gain of the first antenna 2_a_ is about 3 dBi.

The radiation pattern 13 in the second section YZ does not show any significant shift in the far field directivity of the first antenna 2_a_.

The radiation pattern 14 in the third section XY shows that the maximum of the gain of the first antenna is shifted when the first isolator 5 is present. Specifically, when the first isolator 5 is not present (curve 14_a_), the gain of the first antenna 2_a_ is at a maximum in the vicinity of an angle of 270°, whereas when the first isolator 5 is present (curve 14_b_), the gain of the first antenna 2_a_ is at a maximum in the vicinity of an angle of 180°.

FIG. 8 plots a radiation pattern 15 for the second antenna 2_b_ in the first section XZ, a radiation pattern 16 for the second antenna 2_b_ in the second section YZ, and a radiation pattern 17 for the second antenna 2_b_ in the third section XY. The radiation patterns 15, 16, and 17 correspond to the situation as shown in FIGS. 4 and 5, i.e. the first antenna 2_a_ is inactive and the second antenna 2_b_ is transmitting (in the second frequency band ranging from 5.9 GHz to 7.2 GHz).

In the radiation patterns 15, 16, and 17, the continuous line curve corresponds to the far field directivity of the second antenna 2_b_ when the first isolator 5 is not present, and the dashed line curve corresponds to the far field directivity of the second antenna 2_b_ when the first isolator 5 is present.

The radiation patterns 15, 16, and 17 reveal that the influence of the first isolator 5 on the far field directivity of the second antenna 2_b_ is moderate. Specifically, the profile of the far field directivity of the second antenna 2_b_ when the first isolator 5 is not present is generally similar to the profile of the far field directivity of the second antenna 2_b_ when the first isolator 5 is present. This is due to the fact that the second axis $E_{2b}$ of the second maximum electric field of the second antenna 2_b_ does not lie directly in the vicinity of the first isolator 5.

It should be observed that the dimensions of the first isolator 5 can be adjusted depending on the intended frequency band.

It should be observed that the greater the conductivity of the material used for making the first isolator 5, the greater the isolation performance of said first isolator 5.

Also, the first axis $E_{2a}$ of the first maximum electric field (of the first antenna 2_a_) and the second axis $E_{2b}$ of the second maximum electric field (of the second antenna 2_b_) could be perpendicular to the second branch 7 of the first isolator 5.

Figure 9:
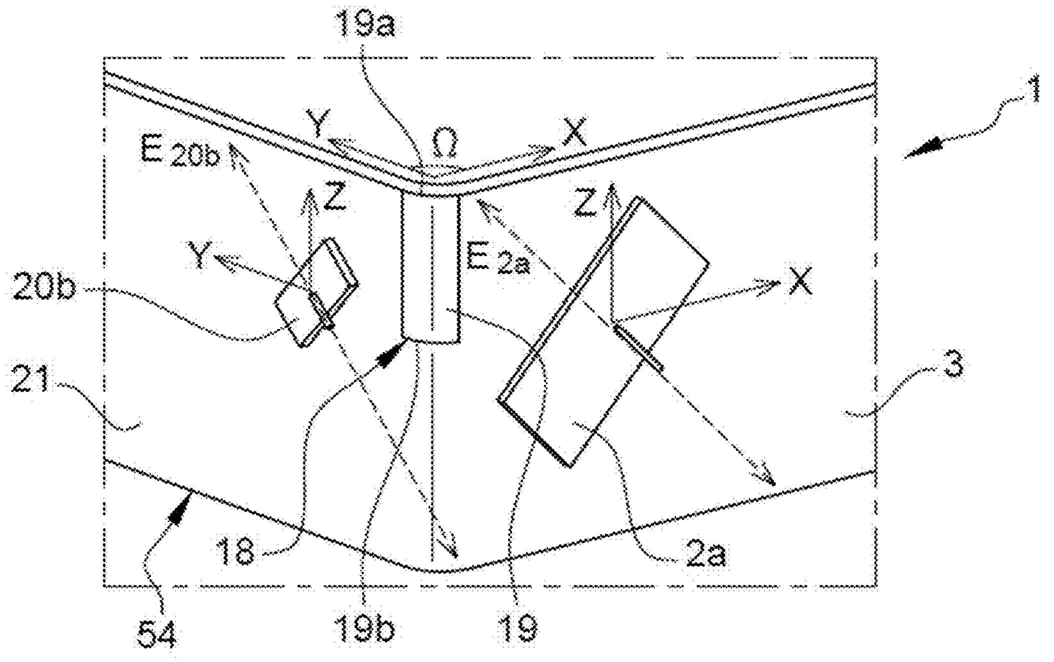
FIG. 9 is a perspective view of a first variant of the RF device in an embodiment.

With reference to FIG. 9, the RF device 1 in an embodiment further includes at least one second isolator 18. The RF device 1 could also include only one second isolator 18.

The second isolator 18 is positioned on one side of a particular one of the first and second antennas 2_a_ and 2_b_, which side of the particular antenna is remote from the first isolator. In FIG. 9, the particular antenna is the first antenna 2_a_, which in this example is positioned to the left of the antenna 2_b_ (not shown in FIG. 9). The second isolator 18 is used to modify and to redirect the far field directivity of the first antenna 2_a_ resulting from the presence of the first isolator 5. The second isolator 18 is considered as an interfering element having an influence on the mapping of the electric field on a support 54.

In this example, the first antenna 2_a_ is positioned on the support 54 having a first face extending in the first plane 3 and a second face extending in a second plane 21. The second plane 21 is defined by the axes Y and Z. The second plane is thus oriented at an angle Ω equal to 90° relative to the first plane 3. It should be observed that the angle of inclination Q between the first plane 3 and the second plane 21 could be other than 90°.

In this example, the second isolator 18 is positioned in a corner of the support 54 defined by the intersection of the first and second planes 3 and 21, and it is fastened by fastener means, e.g. comprising stakes, adhesive, or indeed screws.

In this example, the second isolator 18 has a single branch 19. In this example, the branch 19 of the second isolator 18 is formed by a rectilinear plane track made out of a conductive material, e.g. aluminum, copper, or indeed iron. The second isolator 18 is thus of elongate I-shape. The I-shape is simple and it facilitates fabrication of the second isolator 18 since it is a shape that can be cut out accurately (in particular from a metal plate) and that is easily reproducible.

Thus, the branch 19 of the second isolator 18 is an open circuit transmission line between an end 19_a_ and an end 19_b_. The second isolator is thus an element that is passive.

Also, the second isolator 18 is not electrically connected. In particular, the second isolator 18 is not connected to an electrical ground plane. The second isolator 18 is thus electrically floating.

Still with reference to FIG. 9, provision may be made for the RF device 1 also to have a third antenna 20_b_. The third antenna 20_b_ is planar in shape, and in this example, it lies in the second plane 21.

The third antenna 20_b_ operates in a third frequency band. The third frequency band could be different from the first and second, but it could equally well be similar to the first frequency band or to the second frequency band.

By way of example, the third antenna 20*b* could be a single-band antenna operating in the so-called 6 GHz frequency band.

In this example, the third antenna 20*b* is a planar dipole antenna of rectangular shape. Thus, the third antenna 20*b* presents an omnidirectional radiation pattern in the shape of a torus. The third antenna 20*b* generates a third maximum electric field along a third axis $E_{20b}$. The position of the third antenna 20*b* in the second plane 21 is thus defined along the third axis $E_{20b}$.

In this example, and with reference to FIG. 9, the second isolator 18 is positioned in a corner of the support 54 between the third antenna 20*b* and an antenna that is the first antenna 2*a*.

Figure 10A:
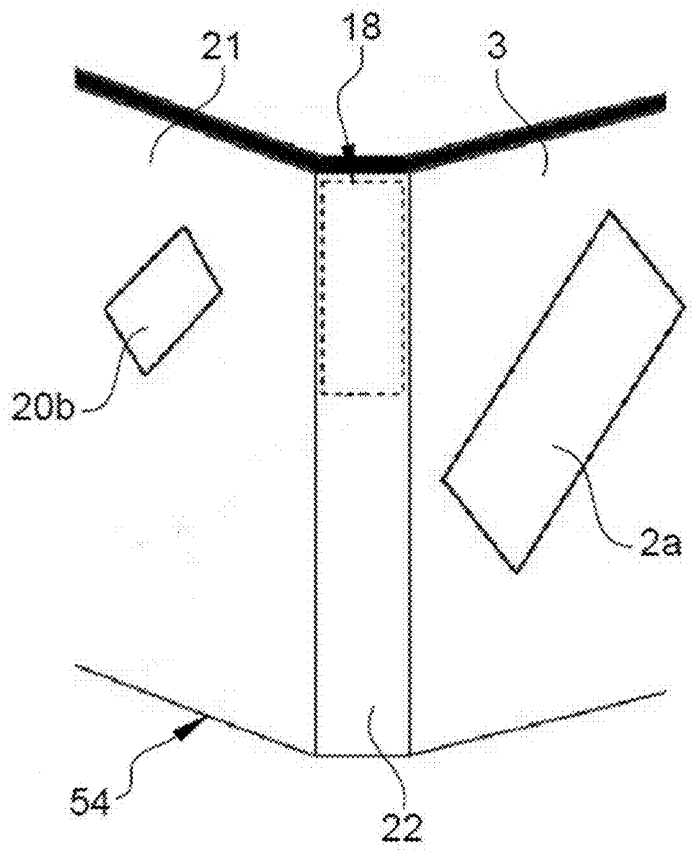
FIG. 10A shows a first position of the second isolator of the RF device shown in FIG. 9.

With reference to FIG. 10A, the second isolator 18 may be positioned in an intersecting plane 22 that intersects the first and second planes 3 and 21. The second isolator 18 is thus positioned at least in part on a chamfer of the support 54.

Figure 10B:
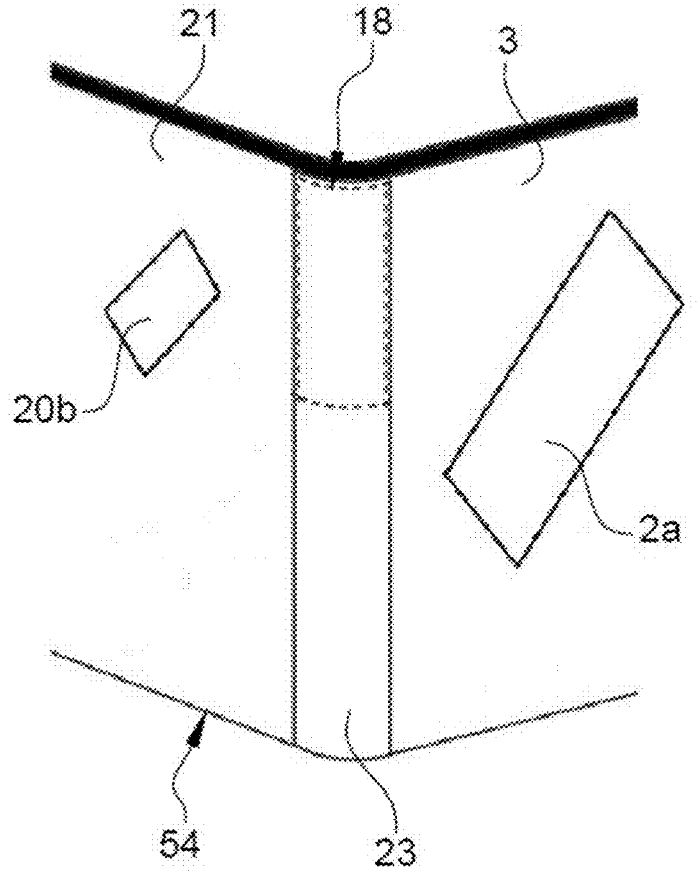
FIG. 10B shows a second position of the second isolator of the RF device shown in FIG. 9.

With reference to FIG. 10B, the second isolator 18 may equally well form a rounded corner 23 between the first and second planes 3 and 21. The second isolator 18 is thus positioned at least in part on a fillet of the support 54.

When it is placed between the first and third antennas 2*a* and 20*b*, the second isolator 18 serves to reduce coupling by electromagnetic radiation between said first and third antennas 2*a* and 20*b*.

The dimensions of the second isolator 18 are predefined as a function of the available space, of the environment in which it is used, and of the frequency band in which it is to have maximum influence.

The dimensions of the second isolator 18 are given herein for the situation in which the second isolator 18 is arranged to isolate the third antenna 20*b* from the electric field generated by the first antenna 2*a*.

Preferably, the branch 19 of the second isolator 18 has a length that is approximately equal to at least one half of a second wavelength $\lambda_B$ taking account of the medium in which the second isolator 18 extends.

In a first example, the second isolator 18 is designed to attenuate the coupling by electromagnetic radiation between the first and third antennas 2*a* and 20*b* both in the first frequency band (in which the first antenna 2*a* operates), and also in the third frequency band (in which the third antenna 20*b* operates), but to a lesser extent than in the first frequency band. If the medium in which the second isolator 18 extends is air, then the second wavelength $\lambda_B$ is calculated using dielectric permittivity equal to 1. In contrast, if the medium in which the second isolator 18 extends is a dielectric support (e.g. a support made of plastics material), then the dielectric permittivity of said dielectric support is taken into account and the second wavelength $\lambda_B$ is such that:

$$\lambda_B = \frac{c}{\nu_{\#} \times \sqrt{\varepsilon r}}$$

where εr is the dielectric permittivity of the material used for making the dielectric support, where c is the velocity of the electromagnetic wave, and where ν1 is the first center frequency of the first frequency band (in which the first antenna 2*a* operates).

In another example, the second isolator 18 is designed to attenuate the coupling by electromagnetic radiation between the first and third antennas 2*a* and 20*b* in balanced (or equal) manner between the first frequency band and the third frequency band. By way of example, the first frequency band is the so-called 5 GHz frequency band and the third frequency band is the so-called 6 GHz frequency band. If the medium in which the second isolator 18 extends is not air, then the second wavelength $\lambda_B$ is such that:

$$\lambda_B = \frac{c}{\frac{\nu_{\#} + \nu_3}{2} \times \sqrt{\varepsilon r}}$$

where ν1 use the first center frequency of the first frequency band (e.g. 5.5 GHz), and where ν3 is a third center frequency that is centered between the maximum frequency and the minimum frequency of the third frequency band (e.g. 6.5 GHz). Other examples of dimensions for the branch 19 of the second isolator 18 may be obtained depending on the isolation desired for the first frequency band or for the third frequency band.

In an example, the dimensions of the second isolator 18, and in particular the width of the branch 19, depend on the characteristics of a selected one of the first and third antennas 2*a* and 20*b*. The respective dimensions of the first and third antennas 2*a* and 20*b* are considered in order to select the greatest dimension(s). For example, when the first frequency band (in which the first antenna 2*a* operates) is the so-called 5 GHz frequency band and the third frequency band (in which the third antenna 20*b* operates) is the so-called 6 GHz frequency band, then the radiating tracks or strands of the first antenna 2*a* are of dimensions or sizes that are greater than the radiating tracks or strands of the third antenna 20*b*. The widths of the radiating tracks or strands of the selected antenna (from among the first and third antennas 2*a* and 20*b*) serve to determine the width of the branch 19 of the second isolator 18. If the first frequency band (first antenna 2*a*) is the so-called 5 GHz frequency band and the third frequency band (third antenna 20*b*) is the so-called 6 GHz frequency band, then the widths of the branch 19 of the second isolator 18 may be about 2.5 mm to 3 mm.

The first antenna 2*a* is selected so as to determine the dimensions of the second isolator 18 and the first antenna 2*a* is positioned on a PCB, itself resting on a first dielectric support (e.g. made out of a plastics material), with the assembly (the PCB and the first plastics material) presenting dielectric permittivity that is equal to about 4.3. In an example, the second isolator 18 is positioned on a second dielectric support (e.g. made out of a plastics material) that may be identical to or different from the first dielectric support on which the first antenna 2*a* is positioned, and that presents dielectric permittivity equal to about 3. As a result of the proximity of two different dielectric permittivities, and given that the first antenna 2*a* is selected for determining the dimensions of the second isolator 18, the characteristic impedance of the branch 19 of the second isolator 18 is approximately equal to the characteristic impedance of the first antenna 2*a*.

In other examples, the branch 19 of the second isolator 18 is of a width that ensures that the characteristic impedance of said branch 19 lies in the range [75Ω, 120Ω]. This makes it possible to maximize electric current flowing through said branch 19 and also to maximize the attenuation of coupling by electromagnetic radiation.

In another example, the width of the branch 19 of the second isolator 18 is not less than the width of the first branch 6 and/or of the second branch 7 of the first isolator 5. In yet another example, the width of the branch 19 of the second isolator 18 is approximately twice the width of the first branch 6 and/or of the second branch 7 of the first isolator 5.

Also, the second isolator 18 operates in the near field. Still assuming in this example that the second isolator 18 is arranged to isolate the third antenna 20*b* from the electric field generated by the first antenna 2*a*, then the distance between the second isolator 18 and the first axis $E_{2a}$ lies in the range 5 mm to 1 cm. This distance serves to optimize limiting of the magnitude of the electric field generated by the first antenna 2*a* and picked up by the third antenna 20*b*. In another example, this distance is greater than 1 cm, e.g. 1.5 cm.

FIGS. 11, 12, 13, and 14 illustrate the role of the second isolator 18 in the RF device 1. In this example, the first antenna 2*a* is a Wi-Fi antenna operating in a frequency band ranging from 5.1 GHz to 5.9 GHz, i.e. in the so-called 5 GHz frequency band. In this example, the third antenna 20*b* is a Wi-Fi antenna operating in a frequency band ranging from 5.9 GHz to 7.2 GHz, i.e. in the so-called 6 GHz frequency band. The first frequency band of the first antenna 2*a* and the third frequency band of the third antenna 20*b* are thus adjacent.

In each of FIGS. 11, 12, 13, and 14, curved field lines 24 represent the orientation of the electric field in the first plane 3 and in the second plane 21. Furthermore, in this example, the magnitude of said electric field (in $V \cdot m^{-1}$) is represented by grayscale levels. In this example, the first antenna 2*a* is operating in transmission and the third antenna 20*b* is inactive.

Figure 11:
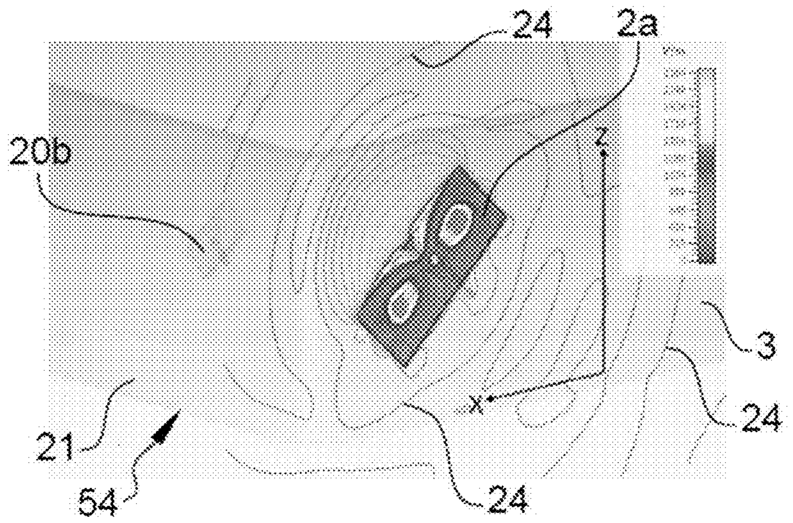
FIG. 11 shows a simulation in a first plane of the electric field of the RF device shown in FIG. 9 when the first antenna is transmitting, and the first isolator is not present.
Figure 12:
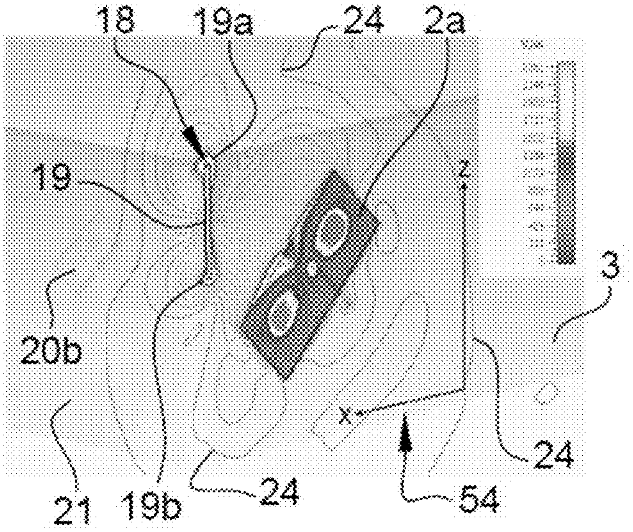
FIG. 12 shows a simulation in a first plane of the electric field of the RF device shown in FIG. 9 when the first antenna is transmitting, and the first isolator is present.

FIGS. 11 and 12 show the orientation and the magnitude of the electric field generated by the first antenna 2*a* in the first plane 3.

Figure 13:
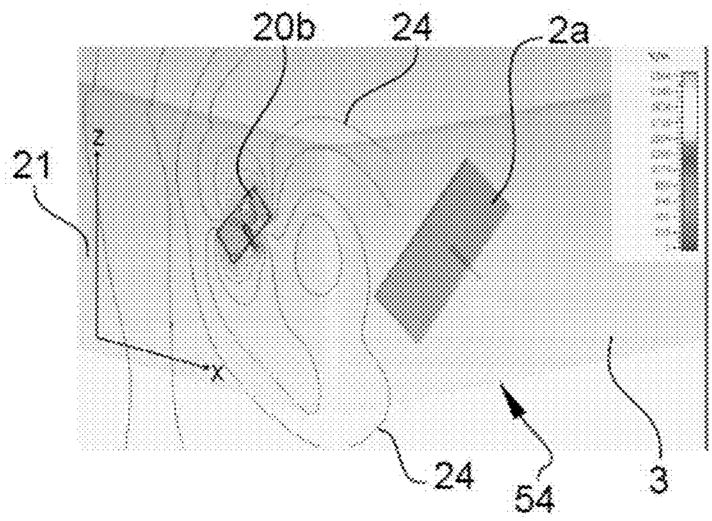
FIG. 13 shows a simulation in a second plane of the electric field of the RF device shown in FIG. 9 when the first antenna is transmitting, and the first isolator is not present.
Figure 14:
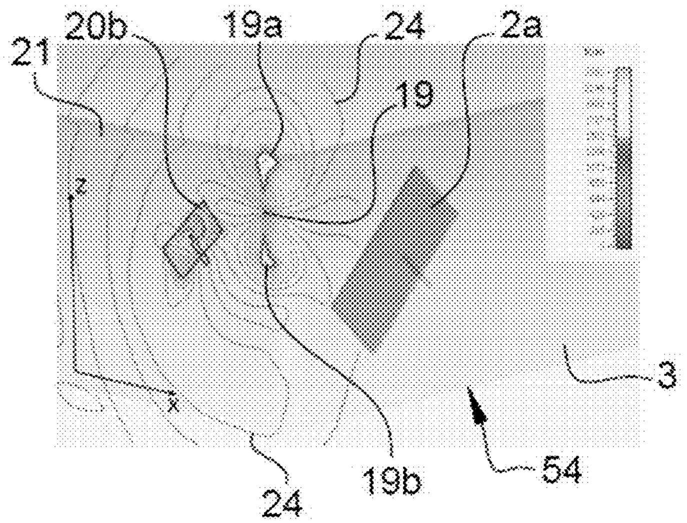
FIG. 14 shows a simulation in a second plane of the electric field of the RF device shown in FIG. 9 when the first antenna is transmitting, and the first isolator is present.

FIGS. 13 and 14 show the orientation and the magnitude of the electric field generated by the first antenna 2*a* in the second plane 21.

When the RF device 1 does not include the second isolator 18, the electric field generated by the first antenna 2*a* propagates through the support 54 along the first axis $E_{2a}$ (FIG. 11). Furthermore, the field lines 24 are concentrated at the third antenna 20*b*, which shows that said third antenna 20*b* picks up a significant portion of the electric field generated by the first antenna 2*a* (FIG. 13).

When the RF device 1 includes the second isolator 18 (FIGS. 12 and 14), the electric field generated by the first antenna 2*a* does not propagate along the first axis $E_{2a}$. The field lines 24 are thus concentrated at the ends 19*a* and 19*b* of the branch 19 of the second isolator 18. In other words, the field lines 24 are deflected from their initial orientation (i.e. their orientation when the second isolator 18 is not present). Deflecting the field lines 24 serves also to attenuate the portion of the electric field generated by the first antenna 2*a* and picked up by the third antenna 20*b*. The second isolator 18 thus serves to reduce the coupling by electromagnetic radiation between the first and third antennas 2*a* and 20*b*.

Figure 15:
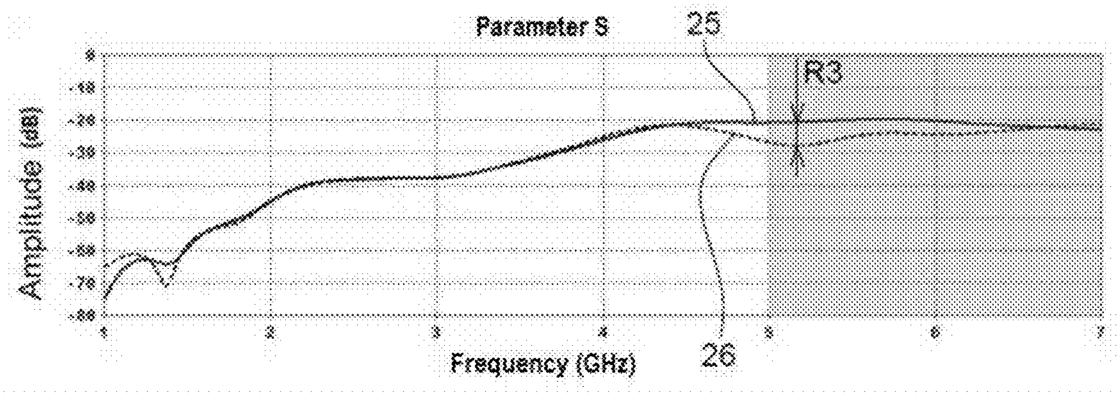
FIG. 15 plots the parameter $S_{21}$ as a function of frequency for the RF device shown in FIG. 9.

FIG. 15 plots the amplitude in decibels of the parameter $S_{21}$ as a function of frequency. The parameter $S_{21}$ corresponds to the transmission coefficient between the third and first antennas 20*b* and 2*a*. The curve 25 is the curve for the parameter $S_{21}$ when the second isolator 18 is not present, and the curve 26 is the curve for the parameter $S_{21}$ when the second isolator 18 is present. In this example, the second isolator 18 has dimensions designed to attenuate coupling by electromagnetic radiation between the first and third antennas 2*a* and 20*b* in a frequency band ranging from 5 GHz to 7 GHz. The second isolator 18 reduces the amplitude of the amplitude of the parameter $S_{21}$ a little in the frequency band for which it is designed. Specifically, and in the vicinity of a frequency equal to 5.2 GHz, there can be seen maximum reduction of about 8 dB (reference R3 in FIG. 15). The second isolator 18 thus serves to attenuate coupling by electromagnetic radiation a little between the first and third antennas 2*a* and 20*b* in the frequency band for which it is designed.

Figure 16:
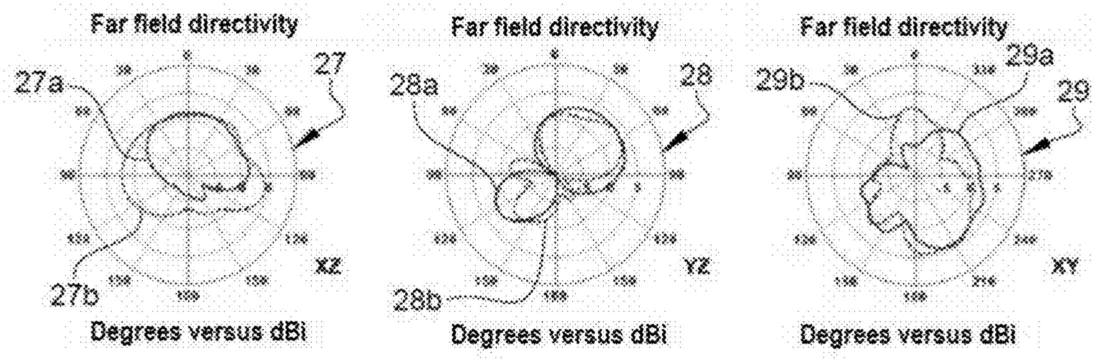
FIG. 16 plots the radiation patterns of the first antenna of the RF device shown in FIG. 9.

FIG. 16 plots a radiation pattern 27 for the first antenna 2*a* in the first section XZ, a radiation pattern 28 for the first antenna 2*a* in the second section YZ, and a radiation pattern 29 for the first antenna 2*a* in the third section XY. The radiation patterns 27, 28, and 29 correspond to the situation is shown in FIGS. 11, 12, 13, and 14, i.e. the first antenna 2*a* is transmitting (in the first frequency band ranging from 5.1 GHz to 5.9 GHz), and the third antenna 20*b* is inactive.

In the radiation patterns 27, 28, and 29, the continuous line curve corresponds to the far field directivity of the first antenna 2*a* when the second isolator 18 is not present, and the dashed line curve corresponds to the far field directivity of the first antenna 2*a* when the second isolator 18 is present.

The radiation patterns 27, 28, and 29 reveal that the second isolator 18 modifies the far field directivity of the first antenna 2*a*.

In particular, the radiation pattern 27 in the first section XZ shows that the far field directivity of the first antenna 2*a* is generally more uniform when the second isolator 18 is present (curve 27*b*). More precisely, when the second isolator 18 is not present (curve 27*a*), the maximum relative variation in the gain of the first antenna 2*a* is about 7 dBi, whereas when the second isolator 18 is present (curve 27*b*), the maximum relative variation in the gain of the first antenna 2*a* is about 5 dBi.

The radiation pattern 28 in the third section XY shows that the maximum of the gain of the first antenna 2*a* is shifted when the second isolator 18 is present. Specifically, when the second isolator 18 is not present (curve 28*a*), the gain of the first antenna 2*a* is at a maximum in angles over the range 210° to 300°, whereas when the second isolator 18 is present (curve 28*b*), the gain of the first antenna 2*a* is at a maximum in the vicinity of a first angle equal to 0° and in the vicinity of a second angle equal to 180°.

Figure 17:
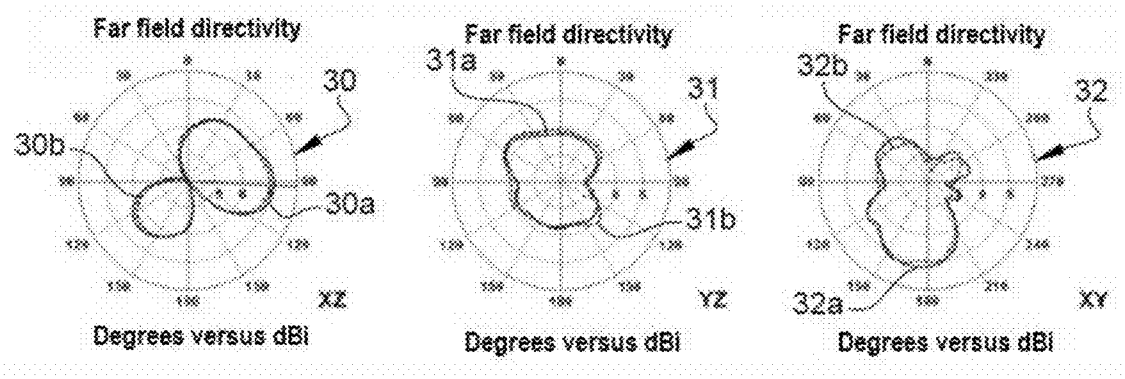
FIG. 17 plots the radiation patterns of the third antenna of the RF device shown in FIG. 9.

FIG. 17 plots a radiation pattern 30 for the third antenna 20*b* in the first section XZ, a radiation pattern 31 for the third antenna 20*b* in the second section YZ, and a radiation pattern 32 for the third antenna 20*b* in the third section XY. The radiation patterns 30, 31, and 32 correspond to the situation in which the third antenna 20*b* is transmitting (in the third frequency band ranging from 5.9 GHz to 7.2 GHz).

In the radiation patterns 30, 31, and 32, the continuous line curve corresponds to the far field directivity of the third antenna 20*b* when the second isolator 18 is not present, and the dashed line curve corresponds to the far field directivity of the third antenna 20*b* when the second isolator 18 is present.

The radiation patterns 30, 31, and 32 reveal that the second isolator 18 has influence on the far field directivity of the third antenna 20*b* that is almost negligible. Specifically, the profiles of the far field directivity and the gain values for the third antenna 20*b* when the second isolator 18 is not present and when the second isolator 18 is present are substantially similar. This is due to the fact that the third axis $E_{20b}$ of the third maximum electric field of the third antenna 20*b* does not lie directly in the vicinity of the second isolator 18.

It should be observed that the attenuation produced by the second isolator 18 is substantially smaller than the attenuation produced by the first isolator 5. This is explained by the fact that the second isolator 18 can be considered as being a wave-directing interfering element.

It should be observed that the dimensions of the first isolator 5 and/or of the second isolator 18 can be adjusted depending on the intended frequency band.

It should be observed that the greater the conductivity of the material used for making the second isolator 18, the greater the isolation performance of said second isolator 18.

Figure 18:
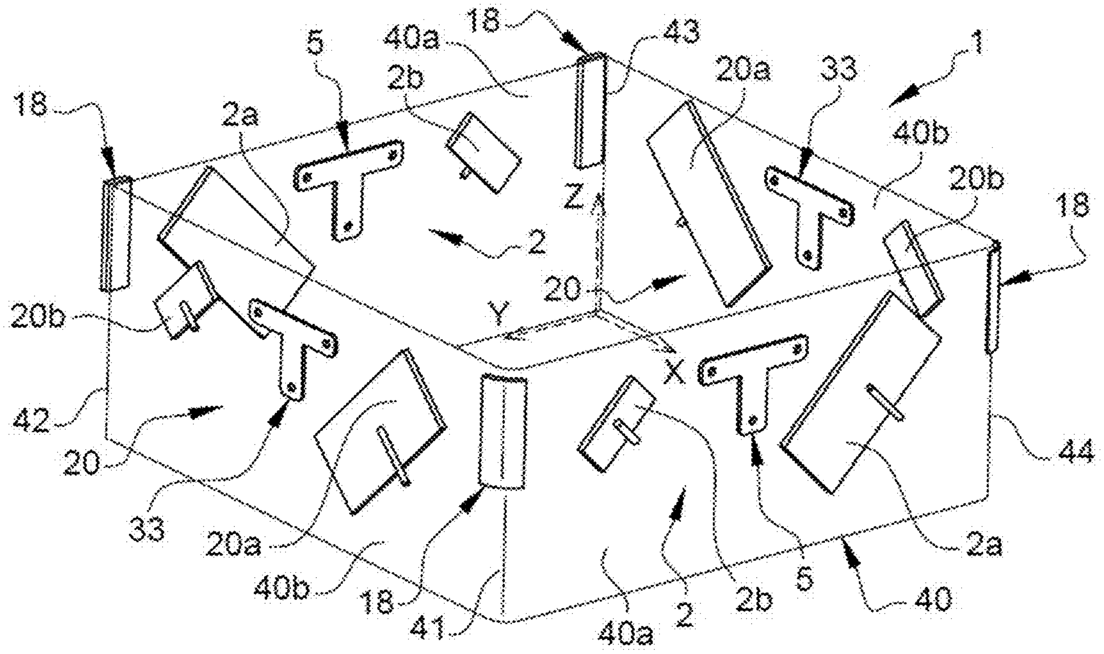
FIG. 18 is a perspective view of a third variant of the RF device in an embodiment.

With reference to FIG. 18, the RF device 1 also has a second antenna set 20 comprising the third antenna 20*b* and a fourth antenna 20*a*. In this example, the second antenna set 20 is similar to the first antenna set 2. Thus, the third antenna 20*b* is similar to the second antenna 2*b*, and the fourth antenna 20*a* is similar to the first antenna 2*a*.

The third and fourth antennas 20*b* and 20*a* lie in the second plane 21 and they are positioned on the support 54.

A third isolator 33 similar to the first isolator 5 is positioned between the third antenna 20*b* and the fourth antenna 20*a*. The third isolator 33 is thus arranged to reduce coupling by electromagnetic radiation between the third antenna 20*b* and the fourth antenna 20*a*.

With reference to FIG. 18, provision is also made for the RF device 1 to have two first antenna sets 2, two second antenna sets 20, two first isolators 5, two third isolators 33, and four second isolators 18.

In this example, the RF device 1 rests on a rectangular support 40 of square section (with corners that are slightly rounded). The rectangular support 40 has two first faces 40*a*, which two first faces 40*a* are parallel with each other; and it has two second faces 40*b*, which two second faces 40*b* are parallel with each other. The rectangular support 40 thus has four corners 41, 42, 43, and 44. The rectangular support 40 is thus generally in the shape of a hollow rectangular cylinder.

Preferably, the rectangular support 40 is made out of a material presenting dielectric permittivity that is greater than 1. For example, the rectangular support 40 may be made out of a plastics material or out of a polymer material.

A respective first antenna set 2 is positioned on each of the two first faces 40*a* of the rectangular support 40. A respective first isolator 5 is positioned between the first and second antennas 2*a* and 2*b* of each of the two first antenna sets 2.

A respective second antenna set 20 is positioned on each of the two second faces 40*b* of the rectangular support 40. A respective third isolator 33 is positioned between the third and fourth antennas 20*b* and 20*a* of each of the two second antenna sets 20.

A respective second isolator 18 is positioned on each of the four corners 41, 42, 43, and 44 of the rectangular support 40.

First and second antenna groups G1 and G2 are defined.

The first antenna group G1 comprises the first antenna 2*a* of each of the two first antenna sets 2 together with the fourth antenna 20*a* of each of the two second antenna sets 20. The first antenna group G1 thus has four antennas. In this example, the antennas of the group G1 are dual-band Wi-Fi antennas operating in a so-called 2.4 GHz frequency band and in the so-called 5 GHz frequency band. In another example, the antennas of the group G1 could be single-band 802.11 technology antennas operating in the so-called 5 GHz frequency band. In another example, the antennas of the group G1 could be single-band 802.11 technology antennas operating in the so-called 6 GHz frequency band. In yet another example, the antennas of the group G1 could be three-band antennas having different subsets of electrical conductors enabling said antennas of the group G1 to operate simultaneously in the so-called 2.4 GHz frequency band, in the so-called 5 GHz frequency band, and in the so-called 6 GHz frequency band.

The second antenna group G2 comprises the second antenna 2*b* of each of the two first antenna sets 2 together with the third antenna 20*b* of each of the two second antenna sets 20. The second antenna group G2 thus has four antennas. In this example, the antennas of the group G2 are single-band Wi-Fi antennas operating in the so-called 6 GHz frequency band.

Also, in the description below, the two first isolators 5, the two third isolators 33, and the four second isolators 18 are referred to collectively as an isolation device.

FIGS. 19, 20, 21, and 22 illustrate the role of the first isolator 5, of the second isolator 18, and of the third isolator 33 in the RF device 1. In these figures, the first antenna 2*a* belonging to the first antenna group G1 is transmitting.

In FIGS. 19, 20, 21, and 22, the magnitude of the electric field (in $V \cdot m^{-1}$) is represented by three distinct zones. A first zone Z1 from 0 $V \cdot m^{-1}$ to 1000 $V \cdot m^{-1}$, a second zone Z2 from 1000 $V \cdot m^{-1}$ to 1400 $V \cdot m^{-1}$, and a third zone Z3 from 1400 $V \cdot m^{-1}$ to about 2360 $V \cdot m^{-1}$.

Figure 19:
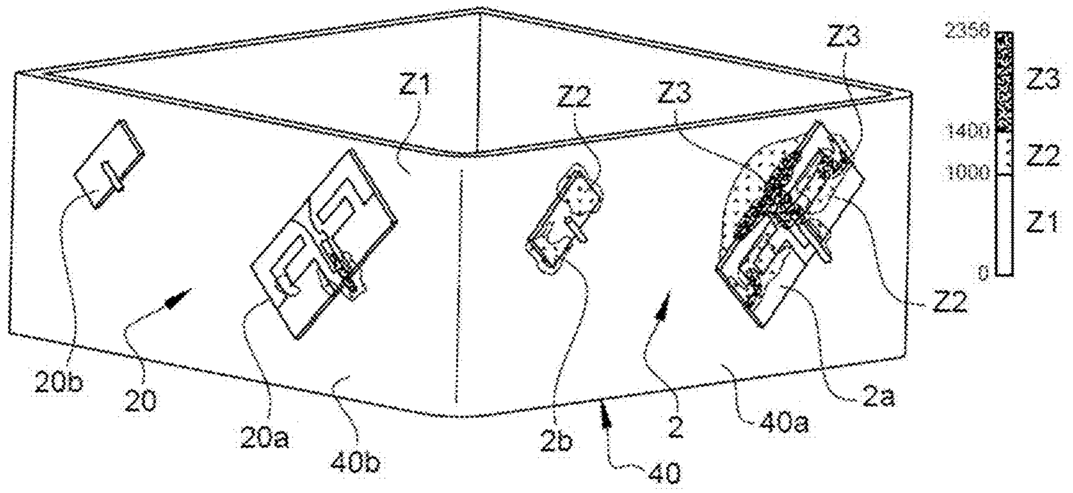
FIG. 19 is a simulation of the electric field of the RF device shown in FIG. 18 when the first antenna is transmitting, and the isolator device is not present.
Figure 21:
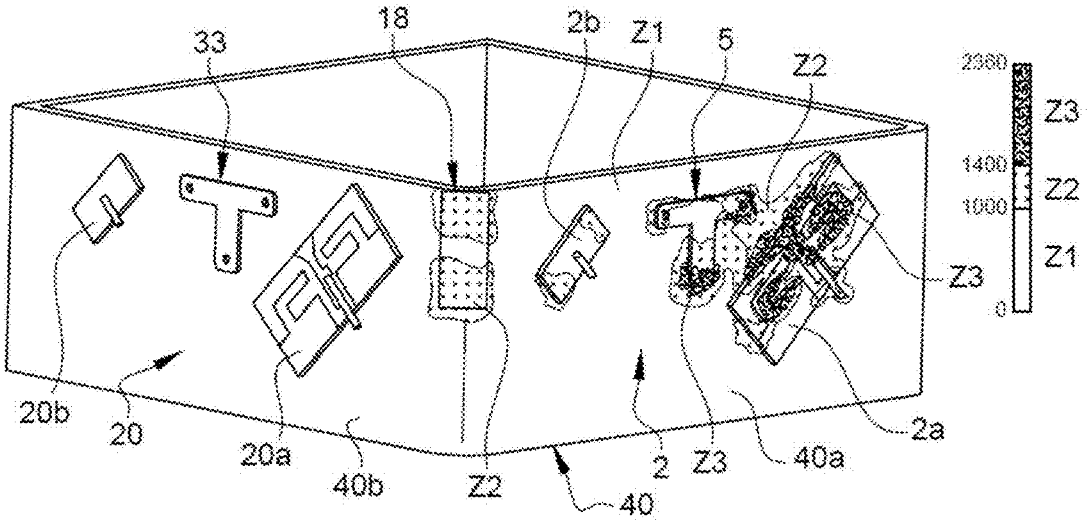
FIG. 21 is a simulation of the electric field of the RF device shown in FIG. 18 when the first antenna is transmitting, and the isolator device is present.

In FIGS. 19 and 21, the first antenna 2*a* (belonging to the first antenna group G1) is transmitting and the other antennas are inactive.

When the isolation device is not present (FIG. 19), a portion of the electric field generated by the first antenna 2*a* is picked up by the other antennas, and in particular by the second antenna 2*b*.

When the isolation device is present (FIG. 21), the electric field generated by the first antenna 2*a* is picked up by the isolation device, and in this example particularly by the first isolator 5. Coupling by electromagnetic radiation between the antennas of the RF device 1 is thus greatly reduced.

Figure 20:
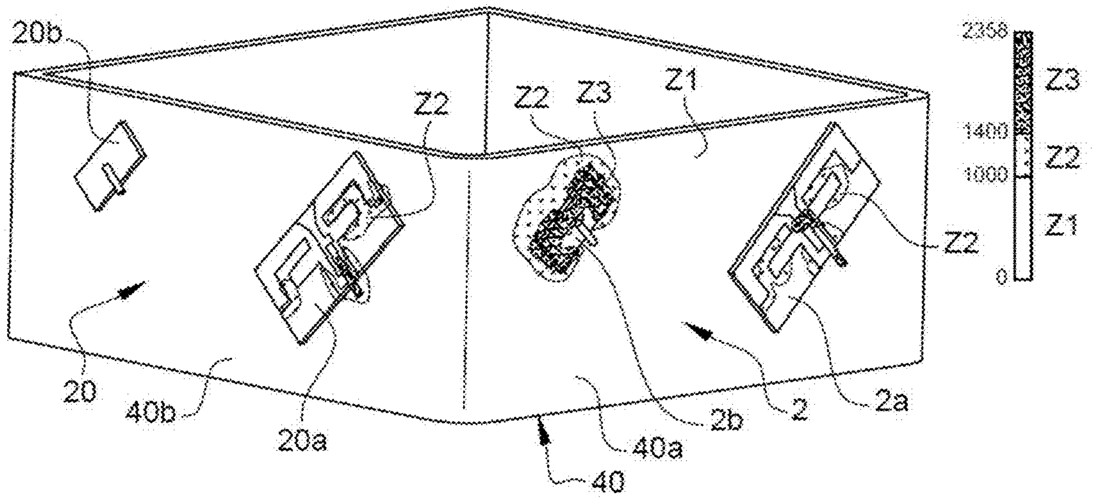
FIG. 20 is a simulation of the electric field of the RF device shown in FIG. 18 when the second antenna is transmitting, and the isolator device is not present.
Figure 22:
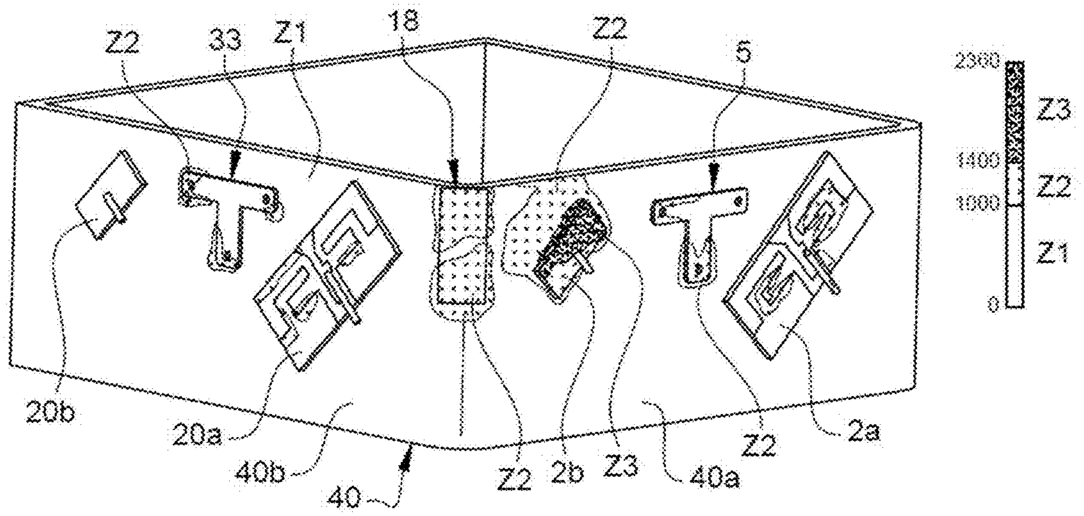
FIG. 22 is a simulation of the electric field of the RF device shown in FIG. 18 when the second antenna is transmitting, and the isolator device is present.

In FIGS. 20 and 22, the second antenna 2*b* (belonging to the second antenna group G2) is transmitting and the other antennas are inactive.

When the isolation device is not present (FIG. 20), a portion of the electric field generated by the second antenna 2*b* is picked up by the other antennas, and in particular by the first antenna 2*a* and by the fourth antenna 20*a* (FIG. 22).

When the isolation device is present (FIG. 22), the electric field generated by the second antenna 2*b* is picked up by the isolation device, and in this example particularly by the second isolator 18. Coupling by electromagnetic radiation between the antennas of the RF device 1 is thus greatly reduced.

Figure 23:
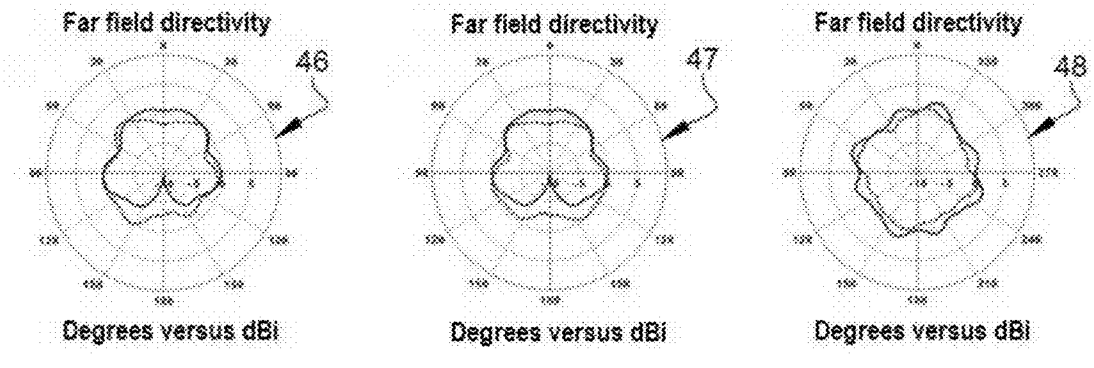
FIG. 23 plots the combined gain radiation patterns of the first antenna group of the RF device shown in FIG. 18.

FIG. 23 shows radiation patterns for the antennas of the first antenna group G1, and specifically a radiation pattern 46 in the first section XZ, a radiation pattern 47 in the second section YZ, and a radiation pattern 48 in the third section XY. More precisely, in this example, the radiation patterns 46, 47, and 48 are average combined-gain radiation patterns.

In the radiation patterns 46, 47, and 48, the continuous line curve corresponds to the combined far field directivity of the antennas of the first antenna group G1 when the isolation device is not present, and the dashed line curve corresponds to the combined far field directivity of the antennas of the first antenna group G1 when the isolation device is present.

The radiation patterns 46, 47, and 48 reveal that the isolation device serves to make the far field directivity of the antennas of the first antenna group G1 substantially more uniform.

Figure 24:
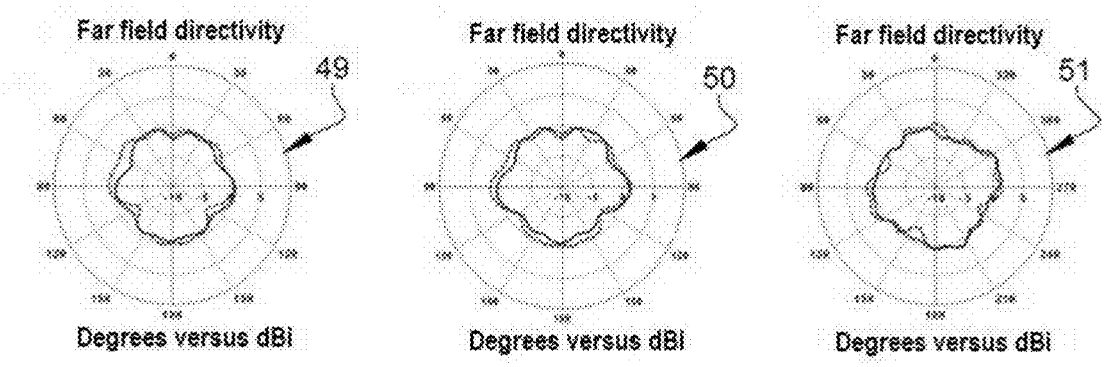
FIG. 24 plots the combined gain radiation patterns of the second antenna group of the RF device shown in FIG. 18.

FIG. 24 shows radiation patterns for the antennas of the second antenna group G2, and specifically a radiation pattern 49 in the first section XZ, a radiation pattern 50 in the second section YZ, and a radiation pattern 51 in the third section XY. More precisely, in this example, the radiation patterns 49, 50, and 51 are average combined-gain radiation patterns.

In the radiation patterns 49, 50, and 51, the continuous line curve corresponds to the combined far field directivity of the antennas of the second antenna group G2 when the isolation device is not present, and the dashed line curve corresponds to the combined far field directivity of the antennas of the second antenna group G2 when the isolation device is present.

The radiation patterns 49, 50, and 51 reveal that the isolation device has limited influence on the far field directivity of the antennas of the second antenna group G2.

The isolation device thus has greater influence on a frequency band in which the antennas of the first antenna group G1 operates than on a frequency band in which the antennas of the second antenna group G2 operate.

The RF device 1 in an embodiment thus serves to respond to the constraints for isolation between the antennas when adjacent frequency bands are in use, while guaranteeing that the radiation pattern of said antennas is omnidirectional (i.e. that the angular distribution of the gain of said antennas is uniform).

Also, the RF device does not require particular antenna technology (e.g. ceramic antennas) and it can be provided using antennas of dimensions that are conventional.

Figure 25:
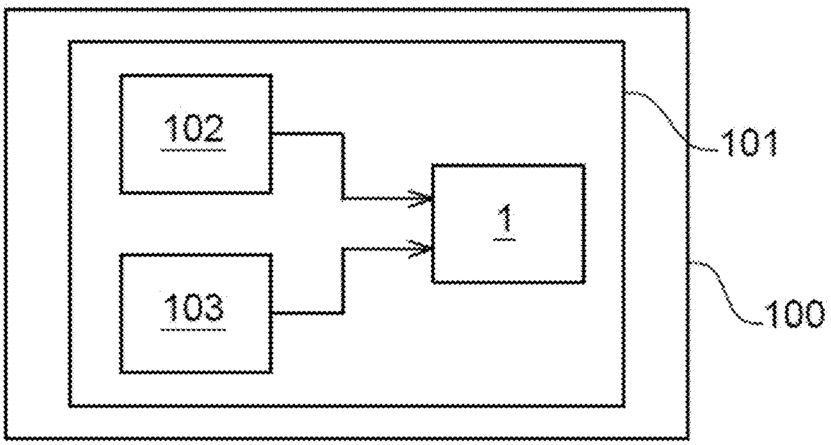
FIG. 25 is a block diagram of a piece of electronic equipment incorporating a MIMO system including the RF device shown in FIG. 18.

With reference to FIG. 25, the RF device 1 in an embodiment is incorporated in a MIMO system 101 that is itself incorporated in a piece of electronic equipment 100. The MIMO system 101 comprises an RF transmitter 102 and an RF receiver 103 that are both connected to the RF device 1 that may be of various different embodiments, e.g. such as the RF device 1 having the first antenna sets 2 and the second antenna sets 20. The RF transmitter 102 is arranged to deliver electrical signals to the RF device 1. The RF receiver 103 is arranged to receive electrical signals coming from the RF signals received by the RF device 1.

Figure 26:
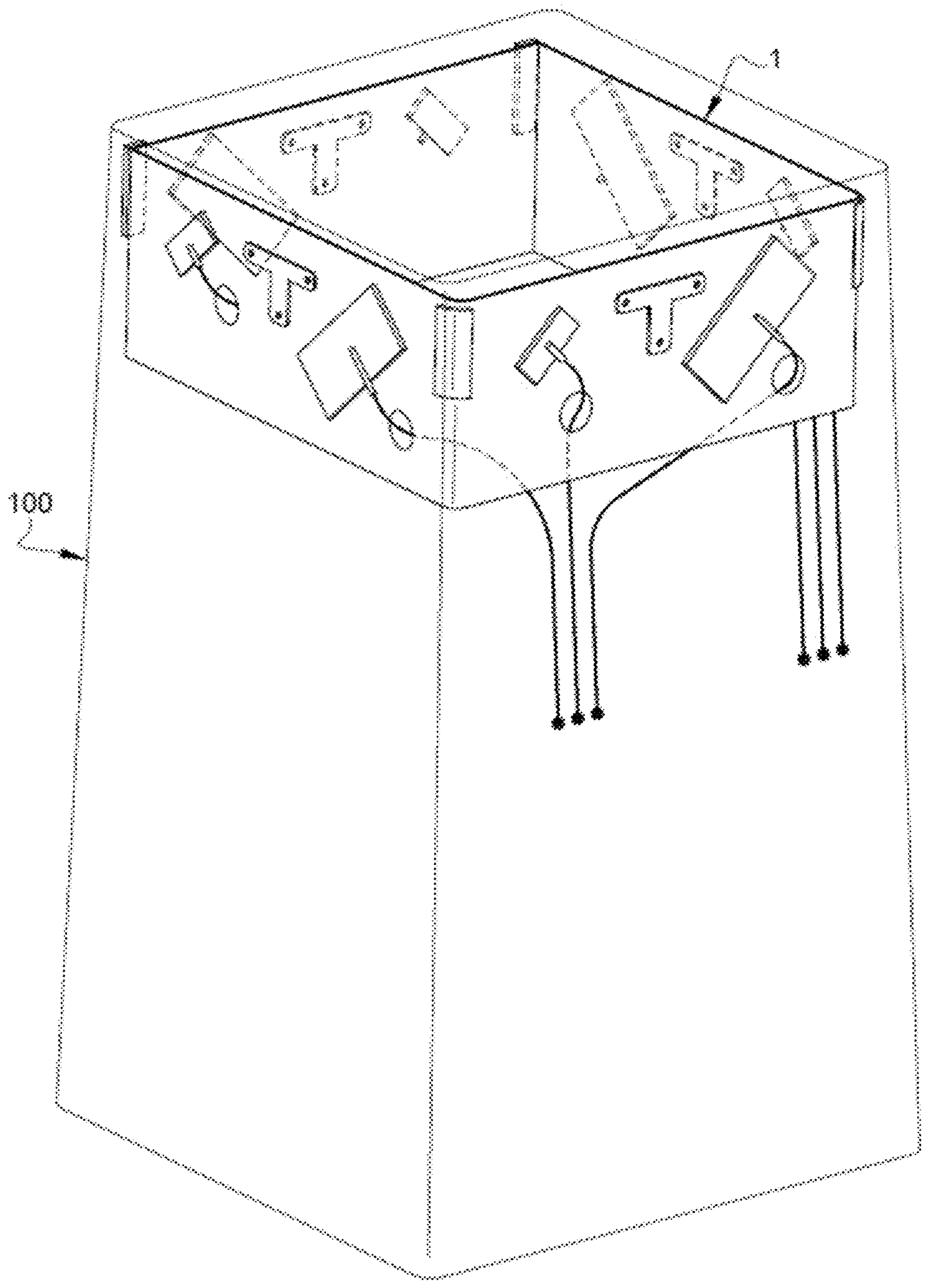
FIG. 26 shows a residential gateway incorporating the RF device shown in FIG. 18.

With reference to FIG. 26, the RF device 1 is incorporated in particular in a piece of electronic equipment 100 constituting a residential gateway. In this example, the residential gateway is in the form of a tower.

Naturally, the invention is not limited to the embodiments described, but covers any variant coming within the ambit of the invention as defined by the claims.

The various embodiments of the RF device can be applied in beneficial manner to any electronic equipment that needs to combine multiple RF interfaces (in particular for communication technologies making use of frequency bands that are different, but adjacent) and/or that needs to provide a plurality of transmission paths over a single frequency band, and to do so in a space of small size.

It should be observed that although above the first isolator 5 is T-shaped, it is entirely possible for the first isolator 5 to have some other shape. For example, the first isolator 5 could have three branches that are all electrically conductive and that are arranged in such a manner that the first isolator 5 is Y-shaped. More generally, the shape of the first isolator 5 could be adapted, for example, as a function of performance specified for the RF device 1. The same applies to the third isolator 33, which is similar to the first isolator 5.

In the same manner, although above the second isolator 18 is I-shaped, it is entirely possible for the second isolator 18 to have some other shape. It should be observed that the shape of the second isolator 18 could be adapted, for example, as a function of performance specified for the RF device 1.

It should be observed that the first isolator 5 is not necessarily fastened to the same support as the support on which the first and second antennas 2*a* and 2*b* are fastened. For example, the first isolator 5 could be fastened on a first auxiliary support that is different from the support 4 or the support 54, so as to be held "in the air" between the first and second antennas 2*a* and 2*b*. The same applies to the third isolator 33, which is similar to the first isolator 5. The third isolator 33 is not necessarily fastened to the same support as the support on which the third and fourth antennas 20*b* and 20*a* are fastened.

In the same manner, the second isolator 18 is not necessarily fastened on a corner of the support 54. For example, the second isolator 18 could be fastened on a second auxiliary support that is different from the support 54, so as to be held in the air, e.g. on the side of the first antenna 2*a* or of the second antenna 2*b* that is remote from the first isolator 5.

Also, the first and second antennas 2*a* and 2*b* need not necessarily be fastened on the same support. The first and second antennas 2*a* and 2*b* could be fastened on respective distinct supports both lying in the same plane.

The invention claimed is:

1. An RF device comprising:

a first antenna set comprising a first antenna and a second antenna, the first and second antennas being planar in shape and both lying in a common first plane, the first antenna being arranged to operate in a first frequency band and the second antenna being arranged to operate in a second frequency band;

a first isolator, the first isolator being planar in shape and lying in the first plane between the first and second antennas, the first isolator having at least one branch that is electrically conductive, the first isolator being electrically floating, the first isolator being arranged to reduce first coupling by electromagnetic radiation between the first and second antennas in the first frequency band and/or in the second frequency band;

at least one second isolator having at least one electrically conductive branch, the second isolator being electrically floating, the second isolator being positioned on one side of a particular antenna selected from the first and second antennas, said side of the particular antenna being remote from the first isolator, the second isolator being arranged to correct a modification to the directivity of the particular antenna as caused by the presence of the first isolator.

2. The RF device according to claim 1, wherein the first and second frequency bands are separated by a frequency gap lying in the range approximately 0 MHz to approximately 1 GHz.

3. The RF device according to claim 1, wherein the first antenna set and the first isolator are positioned on a support made out of a dielectric material, the support lying in the first plane.

4. The RF device according to claim 1, wherein the first isolator has first and second branches that are both electrically conductive, the second branch are substantially perpendicular to the first branch and projecting from a central portion of the first branch, a free end of the second branch is open circuit, the first isolator thus is T-shaped.

5. The RF device according to claim 4, wherein the first and second antennas are planar dipole antennas, each is rectangular in shape, the first antenna is arranged to generate a first maximum electric field along a first axis, the second antenna is arranged to generate a second maximum electric field along a second axis, and the first and second axes are substantially parallel to each other.

6. The RF device according to claim 5, wherein the first and second axes are oriented at substantially 45° relative to the second branch.

7. The RF device according to claim 5, wherein the first and second axes are substantially perpendicular to the second branch.

8. The RF device according to claim 5, wherein the first maximum electric field is greater than the second maximum electric field, one end of the first branch of the first isolator is spaced apart from the first axis ($E_{2a}$) by a distance lying in the range 5 mm to 1.5 cm.

9. The RF device according to claim 4, wherein the first isolator is arranged to reduce the first coupling by electromagnetic radiation to a greater extent in the first frequency band, the first branch of the first isolator has a predefined length that is substantially equal to at least one quarter of a first wavelength $\lambda_A$, the first wavelength $\lambda_A$ being such that:

$$\lambda_A = \frac{c}{v_1 \times \sqrt{\varepsilon r}}$$

wherein $v_1$ is a first center frequency centered between the maximum frequency and the minimum frequency of the first frequency band, and wherein $\varepsilon r$ is the dielectric permittivity of the medium in which the first isolator lies, the medium being a dielectric support or air.

10. The RF device according to claim 4, wherein the first isolator is arranged to reduce the first coupling by electromagnetic radiation in equal manner in the first and second frequency bands, the first branch of the first isolator has a predefined length that is substantially equal to at least one quarter of a first wavelength $\lambda_A$, the first wavelength $\lambda_A$ being such that:

$$\lambda_A = \frac{c}{\frac{v_1 + v_2}{2} \times \sqrt{\varepsilon r}}$$

wherein $v_1$ is a first center frequency centered between the maximum frequency and the minimum frequency of the first frequency band, wherein $v_2$ is a second center frequency centered between the maximum frequency and the minimum frequency of the second frequency band, and wherein $\varepsilon r$ is the dielectric permittivity of the medium in which the first isolator lies, the medium being a dielectric support or air.

11. The RF device according to claim 9, wherein the second branch of the first isolator has a predefined length that is substantially equal to one quarter of the first wavelength $\lambda_A$.

12. The RF device according to claim 4, wherein the first branch of the first isolator has a width that is predefined so that the characteristic impedance of said first branch is substantially equal to the characteristic impedance of one antenna selected from the first and second antennas, the second branch of the first isolator has a width that is predefined so that the characteristic impedance of said second branch is substantially equal to the characteristic impedance of the antenna selected from the first and second antennas.

13. The RF device according to claim 4, wherein the first branch of the first isolator has a width that is predefined so that the characteristic impedance of said first branch lies substantially in the range 75Ω to 120Ω, the second branch of the first isolator has a width that is predefined so that the characteristic impedance of said second branch lies substantially in the range 75Ω to 120 Ω.

14. The RF device according to claim 1, wherein the first isolator has three branches that are all electrically conductive and that are arranged in such a manner that said first isolator is Y-shaped.

15. The RF device according to claim 1, wherein the second isolator has a single electrically conductive branch, said isolator thus having a shape that is longitudinal.

16. The RF device according to claim 1, comprising a third antenna extending in a second plane, wherein the second isolator also is arranged to reduce second coupling by electromagnetic radiation between the third antenna and the particular antenna over a particular frequency band in which the particular antenna operates and over a third frequency band in which the third antenna operates.

17. The RF device according to claim 1, wherein the second isolator is arranged to reduce the second coupling by electromagnetic radiation to a greater extent in the particular frequency band, the single branch of the second isolator has a predefined length that is substantially equal to half a second wavelength $\lambda_B$, the second wavelength $\lambda_B$ being such that:

$$\lambda_B = \frac{c}{v_\# \times \sqrt{\varepsilon r}}$$

wherein $v_\#$ is a particular center frequency centered between the maximum frequency and the minimum frequency of the particular frequency band, and wherein $\varepsilon r$ is the dielectric permittivity of the medium in which the second isolator lies, the medium being a dielectric support or air.

18. The RF device according to claim 15, wherein the second isolator is arranged to reduce the second coupling by electromagnetic radiation in equal manner in the particular frequency band and in the third frequency band, the single branch of the second isolator has a predefined length that is substantially equal to half a second wavelength $\lambda_B$, the second wavelength $\lambda_B$ being such that:

$$\lambda_B = \frac{c}{\frac{v_\# + v_3}{2} \times \sqrt{\varepsilon r}}$$

wherein $v_\#$ is a particular center frequency centered between the maximum frequency and the minimum frequency of the particular frequency band, wherein $v_3$ is a third center frequency centered between the maximum frequency and the minimum frequency of the third frequency band, and wherein $\varepsilon r$ is the dielectric permittivity of the medium in which the second isolator lies, the medium being a dielectric support or air.

19. The RF device according to claim 15, wherein the branch of the second isolator has a width that is predefined so that the characteristic impedance of said branch is substantially equal to the characteristic impedance of an antenna selected from the particular antenna and the third antenna.

20. The RF device according to claim 15, wherein the branch of the first isolator has a width that is predefined so that the characteristic impedance of said branch lies substantially in the range 75Ω to 120 Ω.

21. The RF device according to claim 16, wherein the second isolator is situated in the proximity of an intersection between the first and second planes.

22. The RF device according to claim 21, wherein the second isolator is positioned in an intersecting plane that intersects the first and second planes.

23. The RF device according to claim 21, wherein the second isolator forming a rounded corner between the first and second planes.

24. The RF device according to claim 16, wherein the first and second planes being perpendicular.

25. The RF device according to claim 16, comprising a second antenna set comprising the third antenna and a fourth antenna, wherein the second antenna set being similar to the first antenna set, and also including a third isolator similar to the first isolator and positioned between the third and fourth antennas.

26. The RF device according to claim 25, comprising a support having four faces comprising two mutually parallel first faces and two mutually parallel second faces, two first antenna sets each positioned on a distinct first face, and two second antenna sets each positioned on a distinct second face, wherein the RF device further comprising two first isolators each positioned between the first and second antennas of a distinct first antenna set, two third isolators each positioned between a third antenna and a fourth antenna of a distinct second antenna set, and four second isolators each positioned in a distinct corner of the support.

27. A MIMO system including the RF device according to claim 25 together with an RF transmitter and an RF receiver both connected to the first and second antenna sets of said RF device.

28. Electronic equipment including a MIMO system according to claim 27.

29. Electronic equipment according to claim 28, wherein the electronic equipment is a residential gateway.

* * * * *